(12) United States Patent
Mascadri et al.

(10) Patent No.: US 11,718,159 B1
(45) Date of Patent: Aug. 8, 2023

(54) DOOR ASSEMBLY, VEHICLE INCLUDING SAME, AND VEHICLE

(71) Applicant: Honda Motor Co., Ltd., Tokyo (JP)

(72) Inventors: Joseph Anthony Mascadri, Mechanicsburg, OH (US); Dakota D. Kirtland, Hilliard, OH (US); Benjamin D. Moninger, Marysville, OH (US); Gavin Reed Montgomery, Columbus, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/723,452

(22) Filed: Apr. 18, 2022

(51) Int. Cl.
*B60J 5/04* (2006.01)
(52) U.S. Cl.
CPC .................... *B60J 5/0487* (2013.01)
(58) Field of Classification Search
CPC ....................................................... B60J 5/0487
USPC ............................................................ 280/749
See application file for complete search history.

(56) References Cited

U.S. PATENT DOCUMENTS

| | | | |
|---|---|---|---|
| 6,676,193 B1 * | 1/2004 | Hanagan | E05D 15/00 296/202 |
| 8,465,050 B1 | 6/2013 | Spindler et al. | |
| 9,016,760 B2 * | 4/2015 | Kuroda | B60R 21/06 296/146.5 |
| 9,061,569 B2 * | 6/2015 | Spindler | B60R 21/06 |
| 9,475,367 B1 | 10/2016 | Wilson, III et al. | |
| 9,765,553 B2 * | 9/2017 | Suzuki | E05B 85/243 |
| 9,771,112 B2 | 9/2017 | Spindler et al. | |
| 9,776,481 B2 | 10/2017 | Deckard et al. | |
| 9,789,753 B2 | 10/2017 | Yamamoto et al. | |
| 10,131,212 B2 | 11/2018 | Gale et al. | |
| 10,246,153 B2 | 4/2019 | Deckard et al. | |
| 10,293,667 B2 | 5/2019 | Gagas et al. | |
| 10,300,877 B2 | 5/2019 | Gordon | |
| 10,427,578 B2 * | 10/2019 | Deckard | B60J 5/0412 |
| 10,525,799 B2 | 1/2020 | Hisamura et al. | |
| 10,583,796 B2 | 3/2020 | Osorio | |
| 10,611,419 B2 | 4/2020 | Spindler et al. | |
| 10,632,823 B1 | 4/2020 | Osorio | |
| 10,766,343 B2 * | 9/2020 | Sullwold | E05D 1/04 |
| 10,800,230 B2 | 10/2020 | Mazzarelli et al. | |
| 10,889,165 B2 | 1/2021 | Osorio | |
| 10,906,590 B2 * | 2/2021 | Osorio | B60J 5/047 |
| 11,014,419 B2 | 5/2021 | Danielson et al. | |

(Continued)

FOREIGN PATENT DOCUMENTS

WO WO2014159122 A1 10/2014

*Primary Examiner* — Jason S Morrow
(74) *Attorney, Agent, or Firm* — Kenealy Vaidya LLP

(57) ABSTRACT

A door assembly for a vehicle can include a door panel having a front edge and a rear edge pivotably attached along a hinge axis to a frame assembly of the vehicle. The hinge axis can be angled away from a vertical direction of the vehicle at an acute angle. A hinge can be disposed at the rear edge of the door panel. The door panel can be configured to pivot about the hinge axis between an opened position and a closed position. A strut can be connected to the door panel and movable between an extended position and a retracted position. A net can be attached to the door panel and can be in tension when the door panel is in the closed position and can be in a less tensioned more curved configuration when the door panel is in the opened position.

20 Claims, 19 Drawing Sheets

(56) References Cited

U.S. PATENT DOCUMENTS

| | | | |
|---|---|---|---|
| 2008/0079284 A1* | 4/2008 | Moreno | B60J 5/0472 |
| | | | 296/146.12 |
| 2019/0078679 A1 | 3/2019 | Leclair et al. | |
| 2019/0367086 A1 | 12/2019 | De Grammont et al. | |
| 2020/0207421 A1* | 7/2020 | Osorio | B60N 3/02 |
| 2022/0297514 A1* | 9/2022 | Yamaguchi | B60J 5/047 |

* cited by examiner

DOOR ASSEMBLY, VEHICLE INCLUDING SAME, AND VEHICLE

BACKGROUND

The disclosed subject matter relates to a door assembly, vehicle including same, and vehicle.

A vehicle can include one or more doors or door assemblies that can permit ingress/egress to/from a vehicle interior or vehicle storage space. A door assembly of a vehicle can be pivotably attached to a frame or other supporting structure of the vehicle. For example, a door assembly can be pivotably attached by a hinge so as to allow the door assembly to be opened and closed. A door assembly of a vehicle includes and/or is associated with various components that allow particular movements, such as rotation and translation, of the door relative to the vehicle frame.

However, known arrangements of door assemblies have deficiencies.

SUMMARY

Some embodiments of the presently disclosed subject matter are directed to a door assembly for a vehicle, the door assembly for selectively opening and closing an opening in a frame assembly of the vehicle. The door assembly can include a door panel having a front edge and a rear edge and configured to pivotably attach to the frame assembly along a hinge axis. The hinge axis can be angled away from a vertical direction of the vehicle at an acute angle. The hinge can be disposed on the rear edge. The door panel can be configured to pivot about the hinge axis between an opened position and a closed position. A gas strut can be connected to the door panel and movable between an extended position and a retracted position. The gas strut can be in the extended position when the door panel is in the opened position and can be in the retracted position when the door panel is in the closed position. The gas strut can be pivotably attached to the frame assembly when the door assembly is mounted on the frame assembly.

Some embodiments of the presently disclosed subject matter are directed to an all-terrain vehicle including a rollover protection assembly. The rollover protection assembly can include first and second longitudinal frame members extending in a longitudinal direction of the vehicle and spaced apart in a transverse direction of the vehicle; a first side frame member extending from the first longitudinal member in a vertical direction of the vehicle; a second side frame member extending from the first longitudinal member in the vertical direction of the vehicle; a third side frame member extending from the first longitudinal member in the vertical direction of the vehicle, and the second side frame member is located between the first side frame member and the third side frame member in the longitudinal direction of the vehicle; and an upper frame member extending in a longitudinal direction of the vehicle and connected to the first side frame member, the second side frame member, and the third side frame member. A first opening can be bounded by the first longitudinal frame member, the first side frame member, and the second side frame member. A front door assembly can extend across the first opening and between the first and second side frame members. The front door assembly can be movably connected to the rollover protection assembly between an opened position and a closed position to selectively open and close the first opening. The front door assembly can include a net assembly and a door panel having a front edge and a rear edge. The door panel can be pivotably attached to the rollover protection assembly along a hinge axis. The hinge axis can be angled away from a vertical direction of the vehicle at an acute angle. A hinge can be disposed on the rear edge. The door panel can be configured to pivot about the hinge axis between the opened position and the closed position. A gas strut can be connected to the door panel and pivotably attached to the rollover protection assembly. The gas strut can be movable between an extended position when the front door assembly is in the opened position and a retracted position when the front door assembly is in the closed position.

Some embodiments of the presently disclosed subject matter are directed to a vehicle including a frame assembly including a plurality of frame members connected together to extend around a passenger space. A first opening can be bounded by the plurality of frame members. A plurality of wheels can be attached to the frame assembly. A door assembly can extend across the first opening in a closed position and can extend away from the opening in an open position. The door assembly can include a door panel having a front edge and a rear edge. The door panel can pivotably attach to the frame assembly along a hinge axis. The hinge axis can be angled away from a vertical direction of the vehicle at an acute angle. A hinge assembly can be disposed on the rear edge. The door panel can pivot about the hinge axis between the opened position and the closed position. A strut can connect to the door panel and pivotably attach to the frame assembly. The strut can be movable between an extended position when the door assembly is in the opened position and a retracted position when the door assembly is in the closed position.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Vehicles can include one or more doors that move from an opened position to a closed position, or from a closed position to an opened position. Vehicle doors can pivot about a front hinge and can include components that attach to or integrate with door panels of the vehicle doors. An example of a component that attaches to a door panel is a net assembly. Net assemblies can attach to doors such that the net assembly limits egress from an inner vehicle space when a door is closed. When the vehicle door is opened, a user desires unobstructed ingress/egress to/from an inner vehicle space. For doors with a front hinge and a net assembly attached, the net assembly can become tightened when the door is opened as a result of the increase in distance between outer attachment points of the net assembly. Accordingly, it can be beneficial to provide a door assembly that has a net assembly and that facilitates ingress and egress of a vehicle space.

Figure 1:
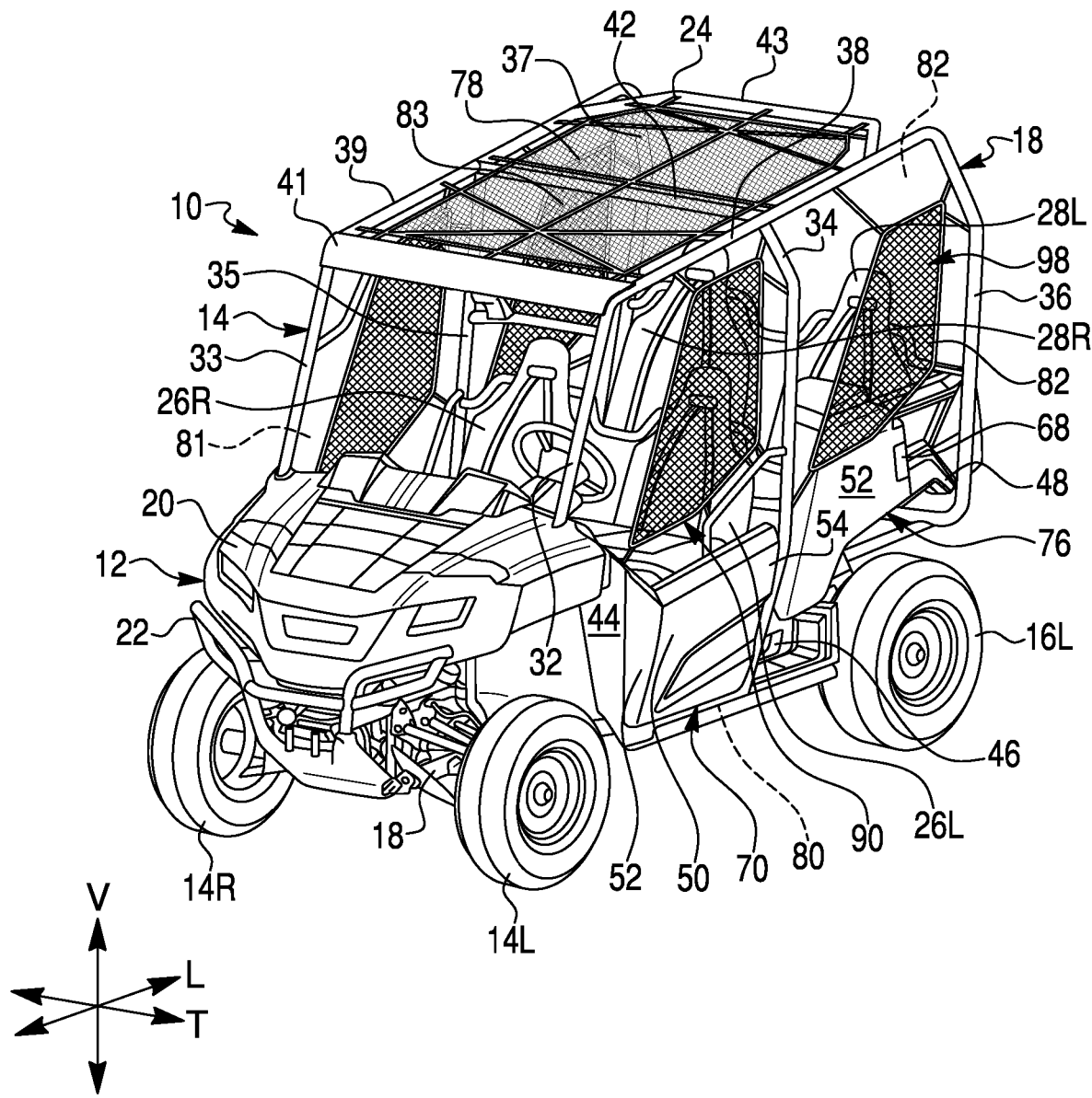
FIG. 1 is a perspective view of a vehicle made in accordance with principles of the disclosed subject matter.

FIG. 1 is a perspective view of an exemplary vehicle 10 including frame assembly 18 made in accordance with principles of the disclosed subject matter. The vehicle 10 shown in FIG. 1 is specialized for use on an unimproved path or on an unmarked path, and can be referred to as a multipurpose utility vehicle (MUV) or as a side-by-side all-terrain vehicle (SxS, or SxS ATV). However, the disclosed vehicle frame assembly with door assembly can be used with any vehicle that is configured for travel along any one or combination of improved, unimproved, and unmarked paths. For example, embodiments are intended to include or otherwise cover any type of vehicle including an automobile, including a passenger car, minivan, truck, other types of all-terrain vehicle (ATV), semi-tractor, off-highway vehicle, snowmobile, boat, plane, etc.

Figure 2:
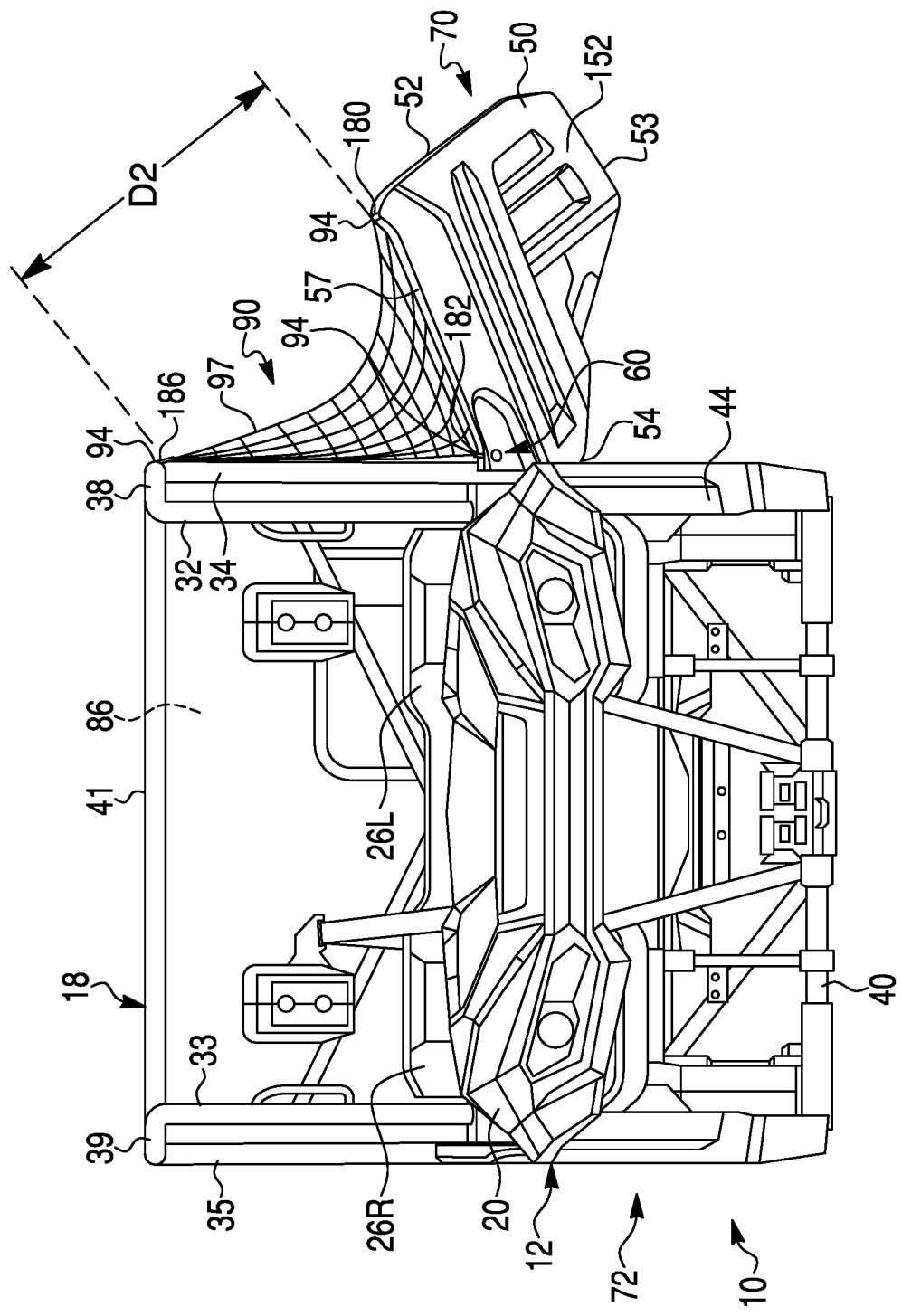
FIG. 2 is a front view of the vehicle of FIG. 1.

Referring to FIGS. 1 and 2, the vehicle 10 can include a body 12, a pair of front wheels, 14L, 14R, a pair of rear wheels 16L, 16R, a frame assembly 18, a pair of front door assemblies 70, 72, a pair of rear door assemblies 76, 78, a hood 20, a front bumper 22, a top net assembly 24, and a powertrain. The powertrain is omitted for simplicity and clarity of the drawings.

The frame assembly 18 can be configured to support the body 12, door assemblies 70, 72, 76, 78, seats 26L, 26R, 28L, 28R, suspension components for the wheels 14L, 14R, 16L, 16R, powertrain, steering system, control pedal assemblies, passengers and cargo items, for example. The frame assembly 18 can be configured to withstand various modes of operation, including operation on unimproved paths, and can be configured to surround the passenger space 86. The frame assembly 18 can also provide an overall bending stiffness and torsional stiffness characteristic for the vehicle 10 that can be advantageous for rugged terrain of an unimproved path.

The frame assembly 18 can include a plurality of frame members connected together to extend around a passenger space. The plurality of frame members can include a pair of longitudinal frame members 30, 31, three pairs of side frame members (also referred to as a pair of A pillars 32, 33, a pair of B pillars 34, 35, and a pair of C pillars 36, 37 or alternatively a pair of first side frame members, pair of second side frame members, and pair of third side frame members), a pair of upper frame members 38, 39, transverse frame members 41, 42, 43, and lower transverse members 40. The frame assembly 18 can include a rollover protection assembly 19 that includes the pair of longitudinal frame members 30, 31, the three pairs of side frame members 32, 33, 34, 35, 36, 37, and the pair of upper frame members 38, 39.

The rollover protection assembly 19 generally defines the passenger compartment. The rollover protection assembly 19 can extend in the longitudinal direction L of the vehicle 10, from the front end of the passenger space 86 to the rear end of the passenger space 86. The rollover protection assembly 19 can define the limits of the passenger space 86 in the transverse direction T of the vehicle 10, the longitudinal direction L of the vehicle 10 and in the vertical direction V of the vehicle 10. The rollover protection assembly 19 can be configured to support the door assemblies 70, 72, 76, 78 and any appropriate portion(s) of the body 12, such as but not limited to flexible side panel(s) (transparent, opaque, or a combination thereof), rigid side panel(s), roof panel (rigid or flexible), flexible or rigid rear panel (transparent, opaque, or a combination thereof), etc.

The rollover protection assembly 19 can be configured to resist, impede, or minimize deformation that could be caused by a load or kinetic energy input into the rollover protection assembly 19. The rollover protection assembly 19 can be configured with any shape and contour that can be advantageous to meet the structural performance and aesthetic appeal desired for the vehicle 10. The rollover protection assembly 19 can be formed from any appropriate number of structural elements, from one to any number greater than one. For example, the rollover protection assembly 19 can include a plurality of frame members 30, 32, 34, 36, and 38 (as shown in FIG. 1), and the right side of the vehicle can be a mirror image of the left side of the vehicle shown in FIG. 1. Each of the frame members can be configured as a hollow tube having a substantially circular or oval cross-section shape. The frame members can be configured with any appropriate elongated shape that can provide the desired dimensionality of the passenger space 86 and advantageously conform to the aesthetic appearance desired for the vehicle 10. For example, the frame members can be made from one or more lengths of a metal tube(s), ceramic tube(s), or other materials. Any one of the tubular frame members can be bent in one or more locations into a predetermined shape.

The longitudinal frame members 30, 31 can extend in a longitudinal direction L of the vehicle and can be spaced apart from each other in a transverse direction T of the vehicle. The first side frame member 32, second side frame member 34, and third side frame member 36 can extend from the first longitudinal frame member 30 in a vertical direction V of the vehicle. Mirrored on the other side of the vehicle 10, the side frame members 33, 35, 37 can extend from the second longitudinal frame member 31 in a vertical direction V of the vehicle 10. The upper frame members 38, 39 can extend in a longitudinal direction L of the vehicle 10 and connect to the side frame members 32, 34, 36 and 33, 35, 37, respectively. The front transverse frame member 41 can extend in a transverse direction T of the vehicle and connect the pair of first side frame members 32, 33 together. The middle transverse frame member 42 can extend in a transverse direction T of the vehicle and connect the pair of second side frame members 34, 35 together. The transverse frame member 43 can extend in a transverse direction T of the vehicle and connect the pair of third side frame members 36, 37 together via the upper frame members 38, 39. The lower transverse members 40 can extend in a transverse direction T of the vehicle and connect the pair of longitudinal frame member 30, 31 together.

The vehicle 10 can include a pair of front seats 26L, 26R and a pair of rear seats 28L, 28R mounted in a passenger space of the vehicle 10. The rollover protection assembly 19 can be configured to extend around and above the seats 26L, 26R, 28L, 28R and the passenger space 86. The rollover protection assembly 19 can cooperate with the body 12 and/or at least a portion of the frame assembly 18 to define door openings 80, 82 through which a passenger may pass in order to enter or exit the passenger space 86.

The door assemblies 70, 72, 76, 78, which occupy the door openings 80, 81, 82, 83, each can be configured to selectively open and close access through the door openings by moving between a closed position and a partially opened or fully opened position. In the closed position, the door assemblies 70, 72, 76, 78, can span the respective door openings 80, 81, 82, 83 to obstruct access to or from the passenger space 86 via the respective door opening. In the closed position (also referred to as fully closed position) or disposition, the front portion of each door assembly 70, 72, 76, 78 can be latched to the rollover protection assembly 19. The partially opened position (or disposition) or the fully opened position (or disposition) can be any position where the door assemblies 70, 72, 76, 78 are pivoted away from the respective door openings to provide substantially unobstructed access to the passenger space 86 via the door openings.

The front door assembly 70 can selectively open and close the opening 80 (also referred to as first opening) in the frame assembly 18 of the vehicle. The opening 80 can be bound by the first longitudinal frame member 30, the first side frame member 32, and the second side frame member 34. The front door assembly 70 can extend across the first opening 80 and between the first and second side frame members 32, 34. The front door assembly 70 can be movably connected to the rollover protection assembly 19 such that it can move between an opened position and a closed position to selectively open and close the first opening 80. The front door assembly 70 can include a net assembly 90, a door panel 50, a hinge 60, and a strut 58.

The net assembly 90 can include a net 92, a plurality of net attachments 94, and a plurality of fasteners 96. The net 92 can be a mesh net having flexibility such that the net can be stretched taught, or in tension, when the plurality of net attachments 94 are connected to the plurality of fasteners 96. The plurality of net attachments 94 can be disposed along a perimeter of the net 90. The net attachments 94 can include straps that extend from an outer net boundary and are connectable to any one of the plurality of fasteners 96. The plurality of fasteners 96 can be disposed on the door panel 50, the rollover protection assembly 19, or anywhere on the perimeter of the opening 80. With respect to the front door assembly 70 shown in FIG. 2, the plurality of fasteners 96 can include a first fastener 180 disposed on the front edge 52 of the door panel 50, a second fastener 182 disposed on a lower portion of the second side frame member 34, a third fastener 184 disposed on an upper portion of the second side frame member 34, and a fourth fastener 186 disposed on the upper frame member 38. Each one of the plurality of net attachments 94 can be connected to any one of the plurality of fasteners 96.

Depending on a shape of the net 92 and an orientation of the plurality of fasteners 96, the net assembly 90 can be attached to the front door assembly 70 such that every one of the plurality of net attachments 94 is connected to one of the plurality of fasteners 96 and the net 92 is in tension in a closed position of the front door assembly 70. When the door assembly 70 is in the opened position, the net 92 slackens while each one of the plurality of net attachments 94 remains connected to a respective one of the plurality of fasteners 96.

The door panel 50 (also can be referred to as a door panel assembly) can include a front edge 52 and a rear edge 54 as well as a lower edge 53 and top edge 57. A hinge 60 can be disposed at or on the rear edge 54 and have a hinge axis, H. The door panel 50 can be pivotably attached to the rollover protection assembly 19 (or any other suitable location on the frame assembly 18) along the hinge axis H on the rear edge 54. The door panel 50 can have a substantially rectangular or trapezoidal shape. The door panel 50 can include an upper portion 150, a lower portion 151, an inner panel 152, and an outer panel 153. The upper portion 150 can include the hinge 60 and at least one of the plurality of fasteners 96. The hinge 60 can be aligned along the hinge axis H at the rear edge 54 of the door panel 50. The front edge 52 can be located on the door panel 50 at a position closest to the front of the vehicle 10 when in the closed position. The rear edge 54 can be located on the door panel 50 at a position closest to the rear of the vehicle 10.

The right-side front door assembly 72 (also referred to as passenger side front door assembly) can be a mirror of left-side front door assembly 70 (also referred to as driver side front door assembly). Rear door assemblies 76, 78 can include the hinge 68 configured in a similar manner as the hinge 60 of the front door assemblies 70, 72 and can connect to any appropriate location in the vehicle 10 including, but not limited to, the frame assembly 18, the rollover protection assembly 19, the body 12, or panels disposed in the vehicle 10. The rear door assemblies 76, 78 can include similar components and configurations as the front door assemblies 70, 72 with modified shapes and orientations to selectively open and close the rear openings 82, 83 in the frame assembly 18. For example, rear door assembly 76 can include a rear net assembly 98, rear door panel 56, and rear hinge 68. The rear door panel 56 can be differently shaped from door panel 50 in order to selectively cover a second opening 82 that can be bounded by the second side frame member 34, the third side frame member 36, and the first longitudinal frame member 30. Right and left side rear door assemblies 76, 78 can be mirrored assemblies of each other on respective sides of the vehicle 10.

The vehicle 10 can include a front bumper 22 mounted to the frame assembly 18, suspension members, a hood 20 adjacent to the front bumper 22, a steering wheel, and accessories, such as but not limited to, headlights, an instrument panel, a wind deflector, and a windshield.

The vehicle 10 can include a top net assembly 24 located atop the vehicle 10 and extending in a transverse T and longitudinal direction L of the vehicle 10. The top net assembly 24 can include a top net, and a plurality of net attachments disposed along a perimeter of the top net and connectable to a plurality of fasteners disposed on the upper frame members 38, 39 and transverse frame members 41, 42, 43.

The vehicle 10 can include a powertrain. The powertrain can include an internal combustion engine, one or more electric motor(s) or a hybrid of an internal combustion engine and one or more electric motor(s), or other known engine/motor. The powertrain can have the engine/motor output axis oriented in the longitudinal direction L or in the traverse direction T of the vehicle 10. The powertrain can be configured to drive only the front wheels 14L, 14R, or configured to drive only the rear wheels 16L, 16R, or configured to drive all of the wheels 14L, 14R, 16L, 16R, or configured to drive the rear wheels 16L, 16R and selectively drive the front wheels 14L, 14R, or configured to drive the front wheels 14L, 14R and selectively drive the rear wheels 16L, 16R.

FIG. 2 is a front view of the vehicle 10 according to the presently disclosed subject matter with the wheels removed for clarity. As shown in FIG. 2, the front left-side door assembly 70 is in an opened position and the front right-side door assembly 72 is in a closed position. The strut 58 (see FIG. 4) can hold the front door assembly 70 in the opened position and has been removed from FIG. 2 for clarity.

The net 92 can include a front leading edge 97 that extends from a lowermost frontmost corner (relative to the vehicle 10) of the net 92 (e.g., at location of fastener 180) to an uppermost frontmost corner of the net 92 (e.g., at location of fastener 186).

In the opened position, the front door assembly 70 is pivoted about the hinge 60 along the hinge axis H such that the door panel 50 pivots both away from the front of the vehicle 10 and in a vertical direction V of the vehicle 10. In the opened position, the first fastener 180 on the door panel 50 is positioned outward in the transverse direction T from the frame assembly 18, backward in the longitudinal direction L, and upward in the vertical direction V from the location of the first fastener 180 when the door panel 50 is in the closed position. The net 92 slackens as the linear (also referring to straight line distance between two points) distance between the first fastener 180 and the fourth fastener 186 has decreased while the door assembly 70 has moved from the closed position to the open position. Put differently, the linear distance D1 between the first fastener 180 and the fourth fastener 186 when the door panel 50 is in the closed position (see FIG. 8) is greater than the linear distance D2 between the first fastener 180 and the fourth fastener 186 when the door panel 50 is in the opened position. This change in distance of the front leading edge 97 of the net 92 causes the net to fold upward and over on top of itself when the door panel 50 is moved away from the closed position and towards an opened position. Thus, the net 92 goes from a substantially planar configuration that is in tension about a periphery of the net 92 when the door panel 50 is in the closed position, to a substantially non-planar, flaccid, bent configuration that has at least the front leading edge 97 in less tension when the door panel 50 is moved away from the closed position and in an opened position. When the door panel 50 is in the opened position, the front leading edge 97 can be described as being in a non-linear configuration that includes a substantial arc shape, or V-shape, or C-shape, or U-shape, or J-shape, or slacked configuration. When the door panel 50 is in the closed position, the front leading edge 97 is in a substantially linear configuration that includes a tensioned straight line shape, and appears linear as compared to the shape when the door panel 50 is in the opened position.

In the fully opened position of door assembly 70, the front edge 52 of the door panel 50 can face away from the vehicle 10 and be pivoted greater than 90 degrees from the position of the front edge 52 when in the closed position. The inner panel 153 of the door assembly 70 faces toward a front of the vehicle and can be angled downward in the vertical direction V of the vehicle 10. The outer panel 153 faces toward a back of the vehicle and is angled upward in the vertical direction V of the vehicle 10.

The fully closed position can be the position at which the front edge 52 of the door panel 50 latches to the frame assembly 18. When a user pulls the door assembly 70 outward or unlatches the door panel 50, the door panel 50 can become disconnected from the frame assembly 18 on a front edge 52 of the door panel 50 and can pivot about the hinge 60 until it reaches the fully opened position. The total arc length that the door assembly 70 pivots from the fully closed position to the fully opened position can be greater than 90 degrees. Thus, the front door assembly 70 can swing through an arc that is greater than 90 degrees when the door assembly 70 pivots from a fully closed position to a fully opened position. However, any arc of pivot can be achieved based on the configuration of the hinge 60, hinge axis H, opening 80, and door assembly 70.

A front bumper 22 can be connected to a front end of the frame assembly 18. The front bumper assembly 22 can extend beyond the exterior of the body 12, or alternatively, one or more portions of the body 12 can conceal the front bumper 12.

Figure 3:
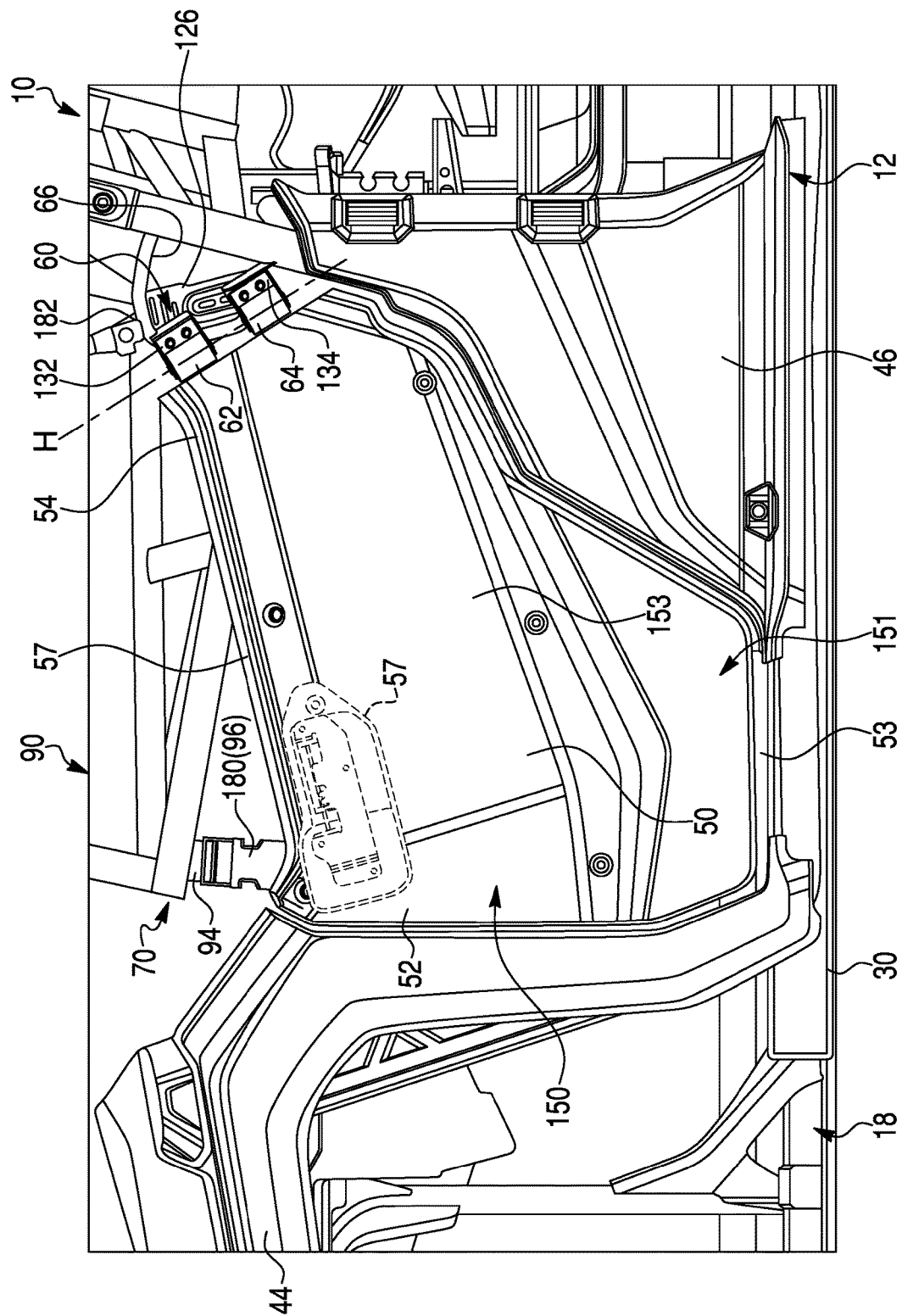
FIG. 3 is a left partial side view showing details of a front door assembly of the vehicle shown in FIG. 1.

FIG. 3 shows a close-up side view of the front door assembly 70 of FIG. 1 with the front door assembly 70 in the closed position. In the closed position, the door panel 50 is adjacent to the wheel panel 44, the first longitudinal frame member 30, and the second side frame member 34. A latch 57 (also referred to as a door handle) can be attached to the front door assembly 70 and can open and secure the door assembly 70. Each door assembly 70, 72, 76, and 78 can include a latch 57. The front edge 52 of the door panel 50 can have the first fastener 180 disposed thereon. The first fastener 180 can include or be connected to a first strap which is one of the plurality of net attachments 94. The rear edge 54 can have the hinge 60 disposed thereon.

The upper portion 150 of the door panel 50 can include the first fastener 180 and the hinge 60. The upper portion 150 can extend from the front wheel panel 44 to the second side frame member 34. The lower portion 151 of the door panel 50 can have a shorter length in the longitudinal direction L and can extend from the wheel panel 44 to a side panel 46 in the longitudinal direction L. In the vertical direction V, the lower portion 151 can extend from about the middle of the door panel 50 to the first longitudinal frame member 30. The door panel 50 can selectively close a lower portion of the opening 80. In combination with the net assembly 90, the door panel 50 can selectively close an upper and lower portion of the opening 80.

A side panel 46 can be connected to the first longitudinal frame member 30 and the second side frame member 34. The side panel 46 can be disposed adjacent to the rear edge 54 of the front door assembly 70.

The hinge 60 (also referred to as the hinge assembly) can include a first hinge 62, a second hinge 64, and a hinge plate 130 attached to a retention bar 66 (also referred to as a hip bar). The first hinge 62 and second hinge 64 can be pivotably attached to a first hinge bracket 132 and a second hinge bracket 134, respectively. Each of the hinge brackets 132, 134 can be mounted to the hinge plate 130 with hinge fasteners 188. The retention bar 66 can be attached to the second side frame member 34. The hinge assembly 60 can pivot greater than 90 degrees from the fully closed position to the fully opened position of the door assembly 70. The hinge assembly 60 can be oriented along a hinge axis H. The angle of the hinge axis H can be measured by the angle between the hinge axis H and the vertical direction V of the vehicle 10. The hinge axis H and the vertical direction V of the vehicle 10 can form an acute angle toward a front of the vehicle 10, such as 10 degrees or more (which would be an 80 degree angle or less for an angle facing forward and formed by hinge axis relative to a longitudinal axis of the lower frame member 30). The retention bar 66 and the side panel 46 can be attached to the second side frame member 34.

Figure 4:
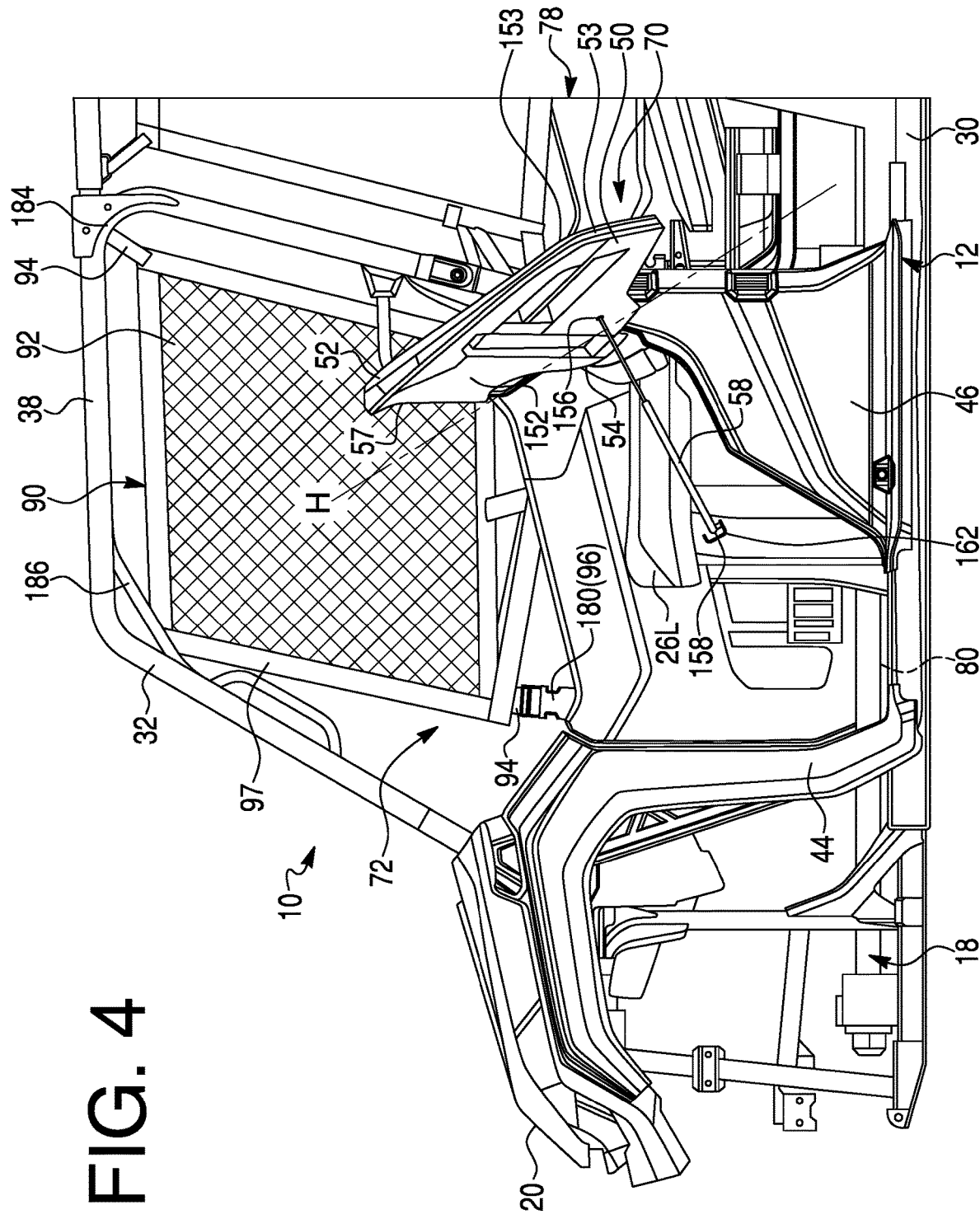
FIG. 4 is a left side view of the vehicle of FIG. 1 with the front door assembly in an opened position.

FIG. 4 is a side view of the vehicle 10 with driver's side front door assembly 70 in the opened position, passenger's side front door assembly 72 in the closed position and the wheels and net assembly 90 for the driver's side front door assembly 70 removed for clarity. The rear door assembly 76 is also in the opened position showing the second opening 82 and the rear door assembly 78 in the closed position on the other side of the vehicle 10. The hinge axis H at the rear edge 52 of the door panel 50 is angled such that the door assembly 70 opens upwardly and the strut 58 connected to the door panel 50 holds the door assembly 70 open.

The opened position of the front door assembly 70 is shown in FIG. 4 including the strut 58 in an extended position. The strut 58 can be a gas strut that can hold the door panel 50 in the opened position when the strut 58 is extended. The strut 58 is pivotably attached to an inner panel 152 of the door panel 50 on a first end 156 and pivotably attached to the frame assembly 18 on a second end 158. The strut 58 can be attached to a member of the frame assembly 18 located under the seat 26L.

The hinge axis H can be angled away from a vertical direction V of the vehicle at an acute angle. Hinge axis H can be the axis about which the door assembly 70 pivots. The hinge axis H can also be the axis which the hinge assembly 60 is aligned. The angle of the hinge axis H can be measured from the vertical direction V of the vehicle 10 to the hinge axis H in a frontward direction of the vehicle 10. That is, the angle of the hinge axis H can be the angle between the hinge axis H and the vertical direction V toward the first opening 80. The hinge axis H angle can be an acute angle. The angle of the hinge axis H can be any acute angle such that the door panel 50 can move from the closed position to the fully opened position in which the first fastener 180 moves outward and upward from the location of the first fastener 180 in the closed position. Additionally, the fully opened position can allow the opening 80 to be sufficiently unobstructed such that an occupant can enter or exit the passenger space of the vehicle 10. An exemplary embodiment can include an angle between the hinge axis and the vertical direction V of the vehicle that can be less than the angle between the hinge axis H and the longitudinal direction L of the vehicle.

When in the opened position, the net 92 of the front door assembly 70 can be loose, or slackened, while remaining connected to the plurality of fasteners 96. In comparison, as shown in FIG. 4, the passenger side front door assembly 72 can be in the closed position with the net 92 of the passenger side front door assembly 72 taught, or in tension.

The opening 80 that the front door assembly 70 selectively opens and closes can be bound by the upper frame member 38, the first side frame member 32, the second side frame member 34, and the first longitudinal frame member 30. On a lower portion of the opening 80, the opening 80 can be adjacent to the wheel panel 44 and the side panel 46 and/or the wheel panel 44 and side panel 46 can partially obstruct the opening 80. When the front door assembly 70 is pivoted to the opened position and held by the strut 58, the seat 26L is accessible from the side of the vehicle 10.

Figure 5:
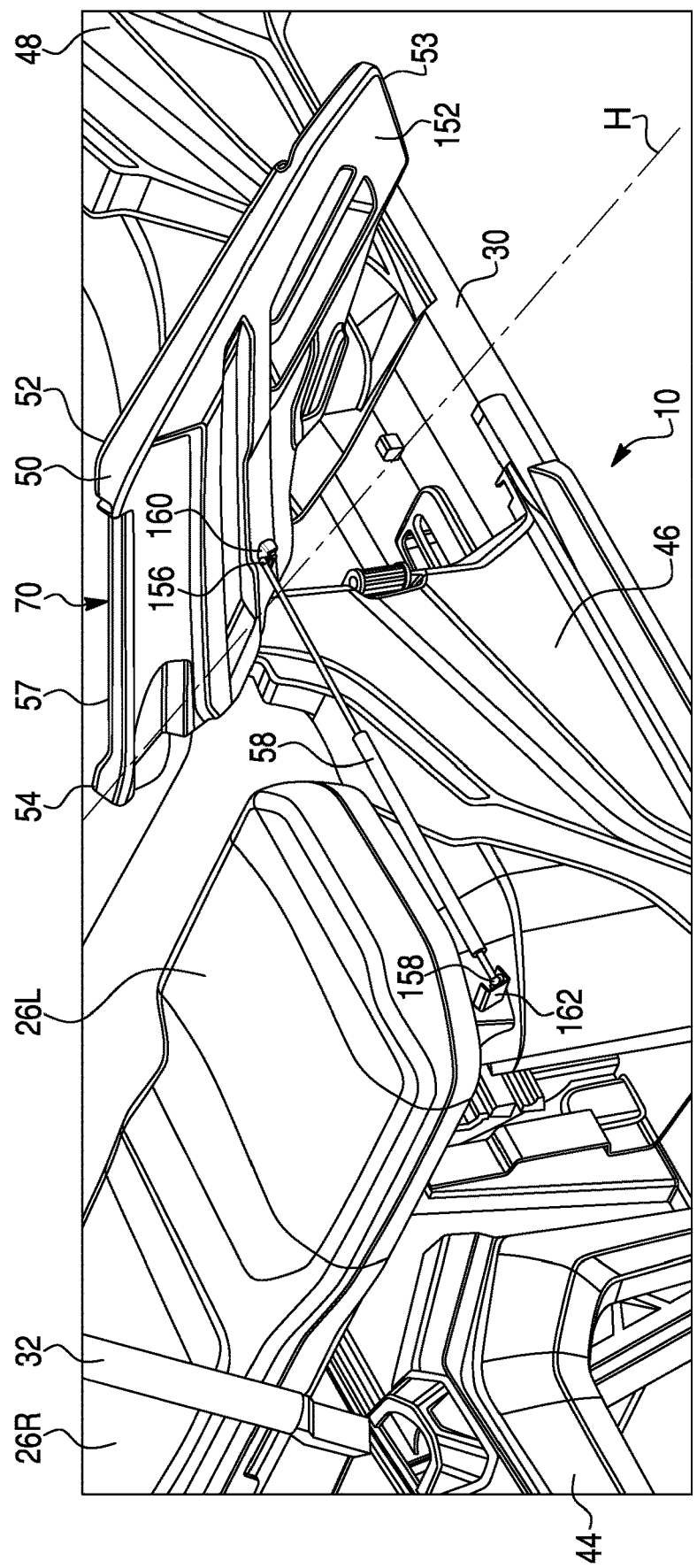
FIG. 5 is a perspective view of the front door assembly of FIG. 4.

FIG. 5 includes a view of the strut 58 of FIG. 4 in the extended position holding the door panel 50 open as the front door assembly 70 is fully pivoted about the hinge axis H to the fully opened position. The strut can be movable between an extended position when the front door assembly is in the opened position and a retracted position when the front door assembly is in the closed position. A first end 156 of the strut 58 is pivotably attached via a bracket 160 to the inner side of the door panel 50. The bracket 160 can be molded to the door panel 50 or integrated with the strut 58 directly into a molding of the door panel 50. The second end 158 of the strut 58 is pivotably attached to the frame assembly 18 beneath the seat 26L via a bracket 162. The bracket 162 beneath the seat 26L can be directly attached to a frame member or attached to a panel underneath the seat 26L. The bracket 162 can be attached by welding, bolting, or any other mechanical fastening. The side panel 46 can partially cover the space underneath the seat 26L. When the front door assembly 70 is in the closed position the door panel 50 can close the opening 80 and the rear edge 54 of the door panel 50 can be adjacent to a front edge of the side panel 46. In the closed position the wheel panel 44 can be adjacent to the front edge 52 of the door panel 50.

Figure 6:
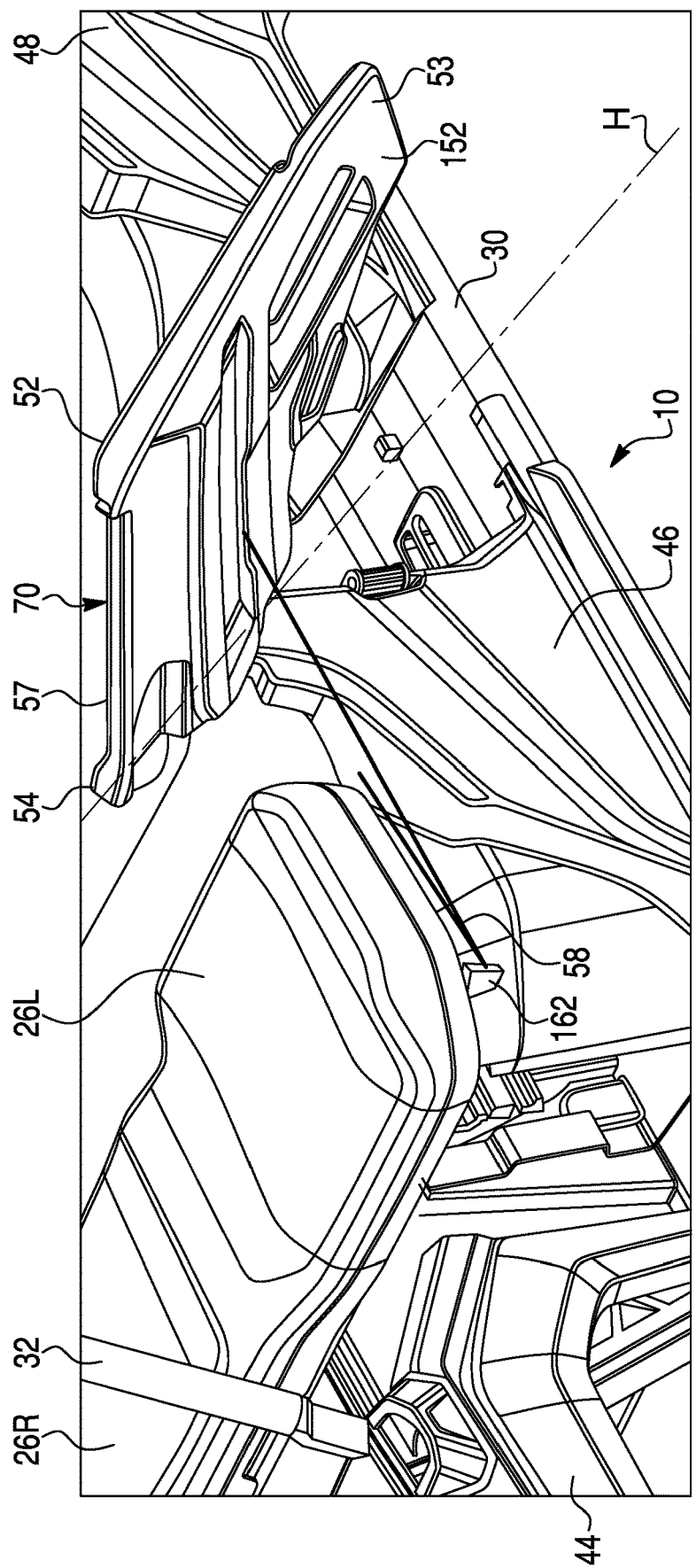
FIG. 6 is a perspective view of the front door assembly of FIG. 4, with a schematic representation of strut positions.

Referring to FIG. 6 there is shown the front door assembly 70 in the opened position. A schematic representation of the strut 58 in the retracted position and the extended position is shown superimposed in the location where the strut 58 can be in each respective position. The second end 158 of the strut 58 that can be disposed underneath the seat 26L can be pivotably fixed to bracket 162 (shown schematically in FIG. 6). The second end 158 can remain fixed to the frame assembly 18 throughout the opening and closing of the front door assembly 70. The first end 156 of the strut 58 that can be pivotably attached to the door panel 50 can be disposed adjacent to the seat 26L in the fully closed position. The first end 156 can move outward in the transverse direction T and upward in the vertical direction V away from the seat 26L as the front door assembly 70 rotates open. The first end 156 can reach its furthest position away from its closed position when the strut 58 reaches the extended position when the front door panel 50 and front door assembly 70 are in the fully opened position.

Additionally, in the fully closed position, the strut 58 can be substantially parallel to an outer edge of the seat 26L (or seat frame member 120) in the longitudinal direction L of the vehicle. In the fully opened position, the strut 58 can extend in a transverse T and vertical direction V away from the seat 26L (or seat frame member 120). In an exemplary embodiment, the strut 58 can include a spring to assist in moving the door panel 50 between the opened and closed position.

Figure 7:
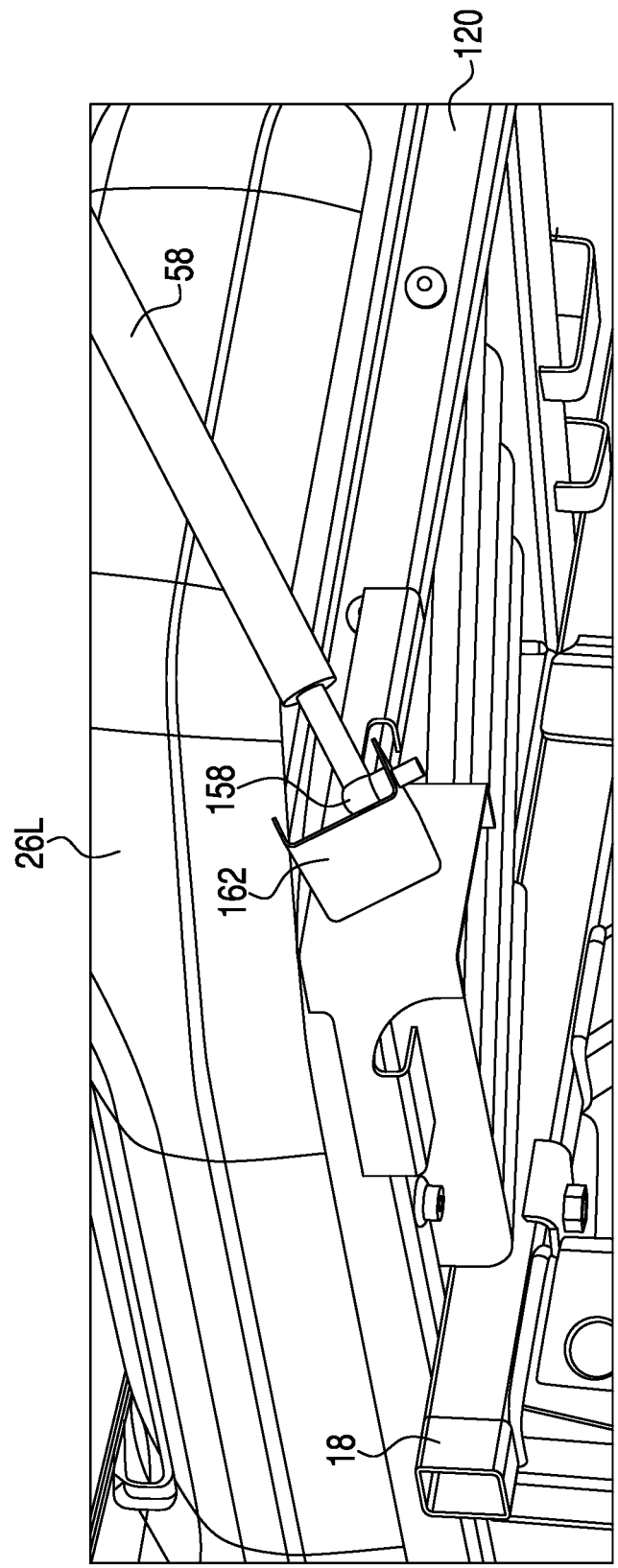
FIG. 7 is a close-up perspective view of a bracket of FIG. 5.

FIG. 7 is a close up view of the bracket 162 of FIG. 5 that the second end 158 of the strut 58 can be pivotably attached to. The second end 158 of the strut 58 can include a ball joint that can be pivotably attached to the bracket 162 or any other type of joint that can allow the strut 58 to pivot freely with respect to the bracket 162. The bracket 162 can be attached to frame assembly 18 via a seat frame member 120 extending from the frame assembly 18. The bracket 162 can be a C-shaped bracket or any other shape known in the art for brackets that allow for pivotable connection thereto. The bracket 162 can attach to any suitable frame member beneath the seat 26L extending from any suitable member of the frame, such as but not limited to, the longitudinal frame members 30, 31, lower transverse members 40, or the second side frame member 34.

Figure 8:
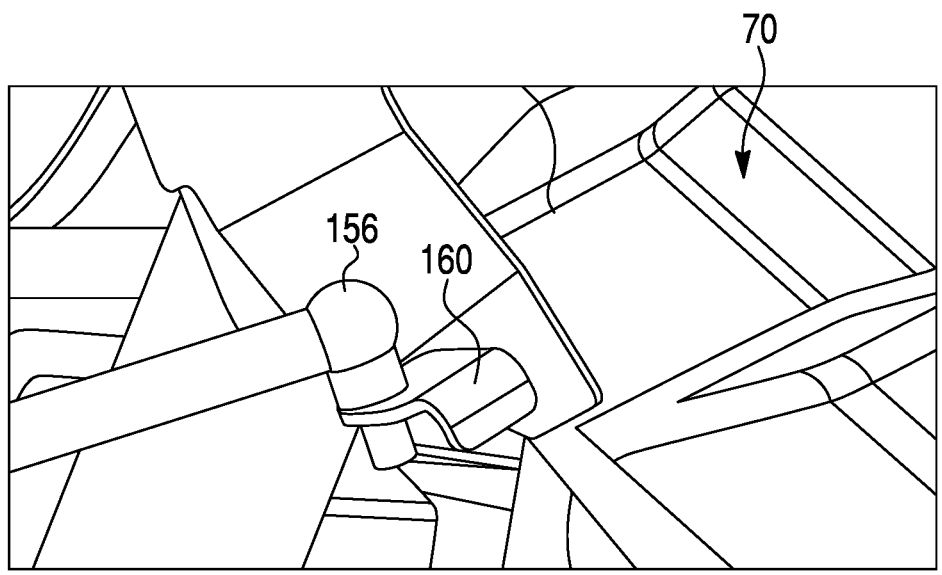
FIG. 8 is a close-up perspective view of a bracket of FIG. 5.

FIG. 8 is a close up view of the bracket 160 of FIG. 5 to which the first end 156 of the strut 58 can be pivotably attached. The first end 156 of the strut 58 can include a ball joint that can be pivotably attached to the bracket 160 or any other type of joint that can allow the strut 58 to pivot freely with respect to the bracket 160. The bracket 160 can be a sheet metal bracket molded or attached to the door frame, or the bracket 160 can be mounted directly into a molding of the door assembly 70.

Figure 9:
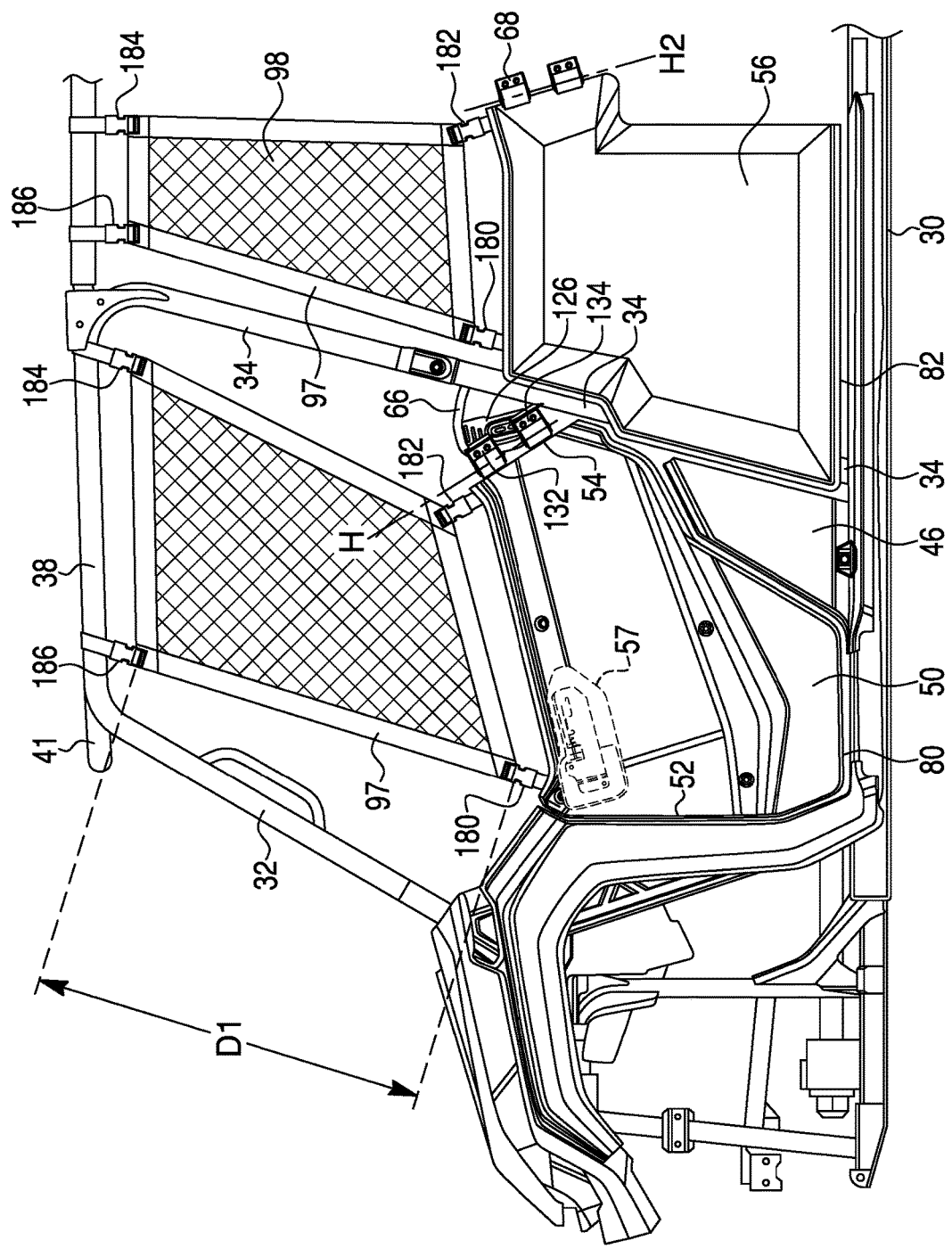
FIG. 9 is a side view of another embodiment of a vehicle made in accordance with principles of the disclosed subject matter.

FIG. 9 depicts another embodiment of a vehicle 10 made in accordance with principles of the disclosed subject matter. In this embodiment, both the front door assembly 70 and rear door assembly 76 are in the fully closed position. In this position, the net assembly 90 of the front door assembly 70 is in a tensioned and substantially planar configuration. In this configuration the front leading edge 97 of the net 92 can form a substantially straight and substantially linear orientation extending from the first fastener 180 to the fourth fastener 186. The distance D1 in this case is the entire length of the front leading edge 97 of the net 92 (distance D1 extending from the first fastener 180 to the fourth fastener 186 when the door assembly 50 is in the closed position). Thus, D1 shown in FIG. 9 can be greater than the distance D2 shown in FIG. 2. Distance D2 being the length extending from the first fastener 180 to the fourth fastener 186 when the door assembly 70 is in an opened position. In other words, the distance from a most frontward and uppermost point of net 92 to a most frontward and lowermost point on net 92 can define the distances D1 and D2 when the door assembly 70 is in the fully closed position and an opened position, respectively. The front leading edge 97 can be formed in a substantially linear configuration when the door assembly 70 is in the fully closed position (See FIG. 9) and can be formed in a substantially non-linear, curved, arcuate, U-shaped, J-shaped, folded-over shaped, or bent shape, when the door assembly 70 is in an opened position (See for example FIG. 2). Put another way, the front leading edge 97 of net 92 can have a longitudinal axis that is substantially straight and has a first change of slope along the longitudinal axis when the door assembly 70 is in the fully closed position, and is more curved and has a second change of slope greater than the first change of slope along the longitudinal axis when the door assembly 70 is in an opened position. Thus, the front leading edge 97 of net 92 is in a more curved and more arcuate configuration when the door assembly 70 is in an opened position as compared to when the door assembly 70 is in the fully closed position. The location and orientation of the hinge 60 and hinge axis H, geometry of door assembly 70, and geometry and attachment locations of net 92 allow the net 92 to remain attached to the top edge of door panel 57 and frame assembly 18 throughout the opening and closing process, and allows the front leading edge 97 of net 92 to change shape from the closed position to the opened position. Thus, a user of the vehicle 10 is not required to (and is not motivated to) detach the net 92 from the vehicle to gain entrance or exit of the vehicle 10. The rear door assembly 76 can be configured in a similar manner as described above with respect to the front door assembly 70, and can have a leading edge 97 that changes shape in a same manner as described above when the door assembly 76 moves from the fully closed position to an opened position. Rear door assembly 76 can pivot about hinge axis H2. Hinge axis H2 can be at the same angle as hinge axis H or it can be at a different angle from hinge axis H.

Figure 10:
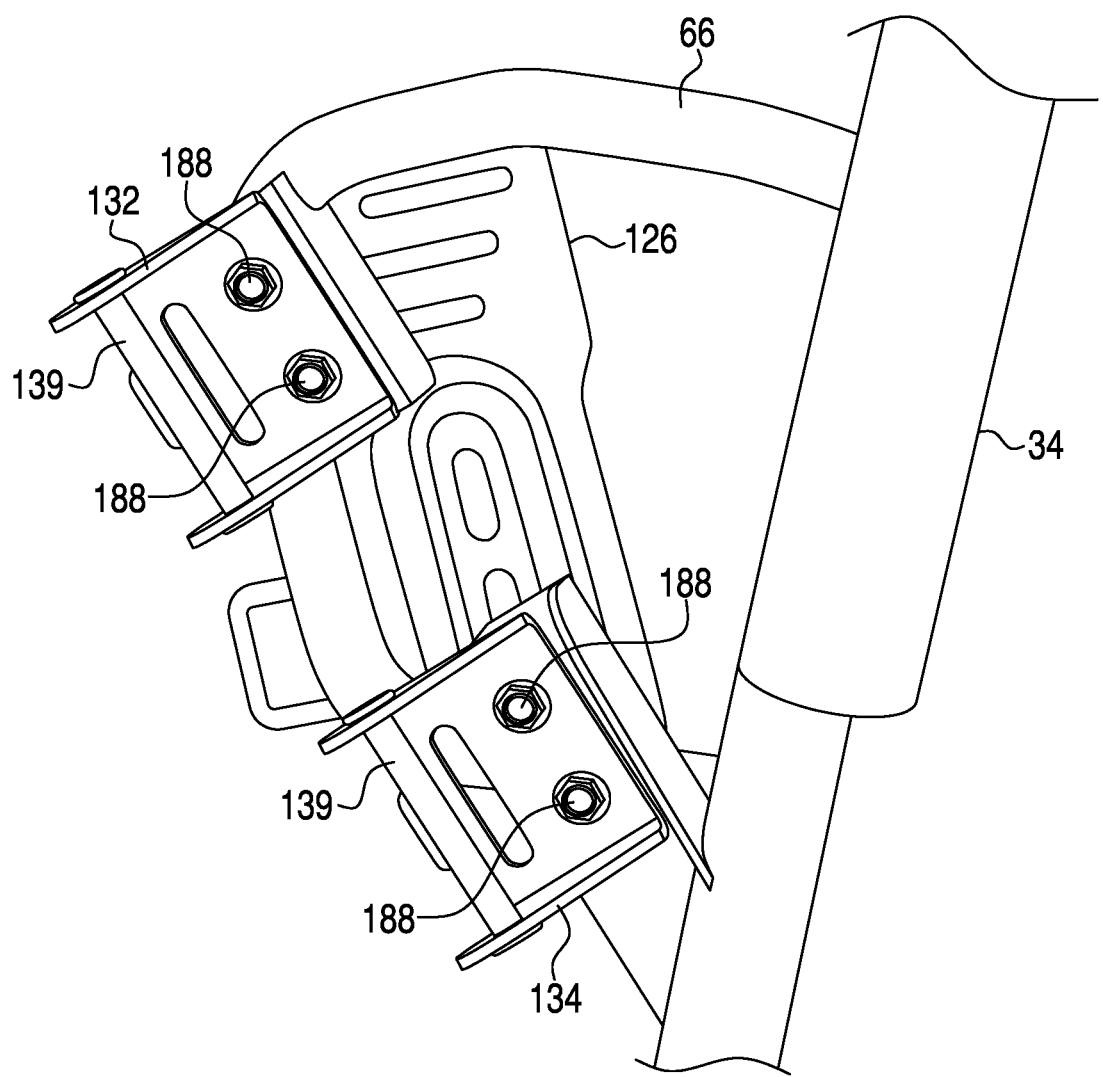
FIG. 10 is a close-up view of hinge brackets mounted to a retention bar of FIG. 3.

FIG. 10 is a close up view of the first hinge bracket 132 and the second hinge bracket 134 attached to the retention bar 66 and the b-pillar 34 of the vehicle 10. The hinge 60 including the first hinge 62 and the second hinge 64 can attach to the first hinge bracket 132 and the second hinge bracket 134, respectively. The first hinge bracket 132 and the second hinge bracket 134 can be bolted to sheet metal bracketry 126 that can be positioned on the b-pillar 34 and the retention bar 66. The hinge brackets 132, 134 can be positioned such that the hinges 62, 64 align along the hinge axis H when the hinges 62, 64 are mounted to the hinge brackets 132, 134, respectively.

Figure 11:
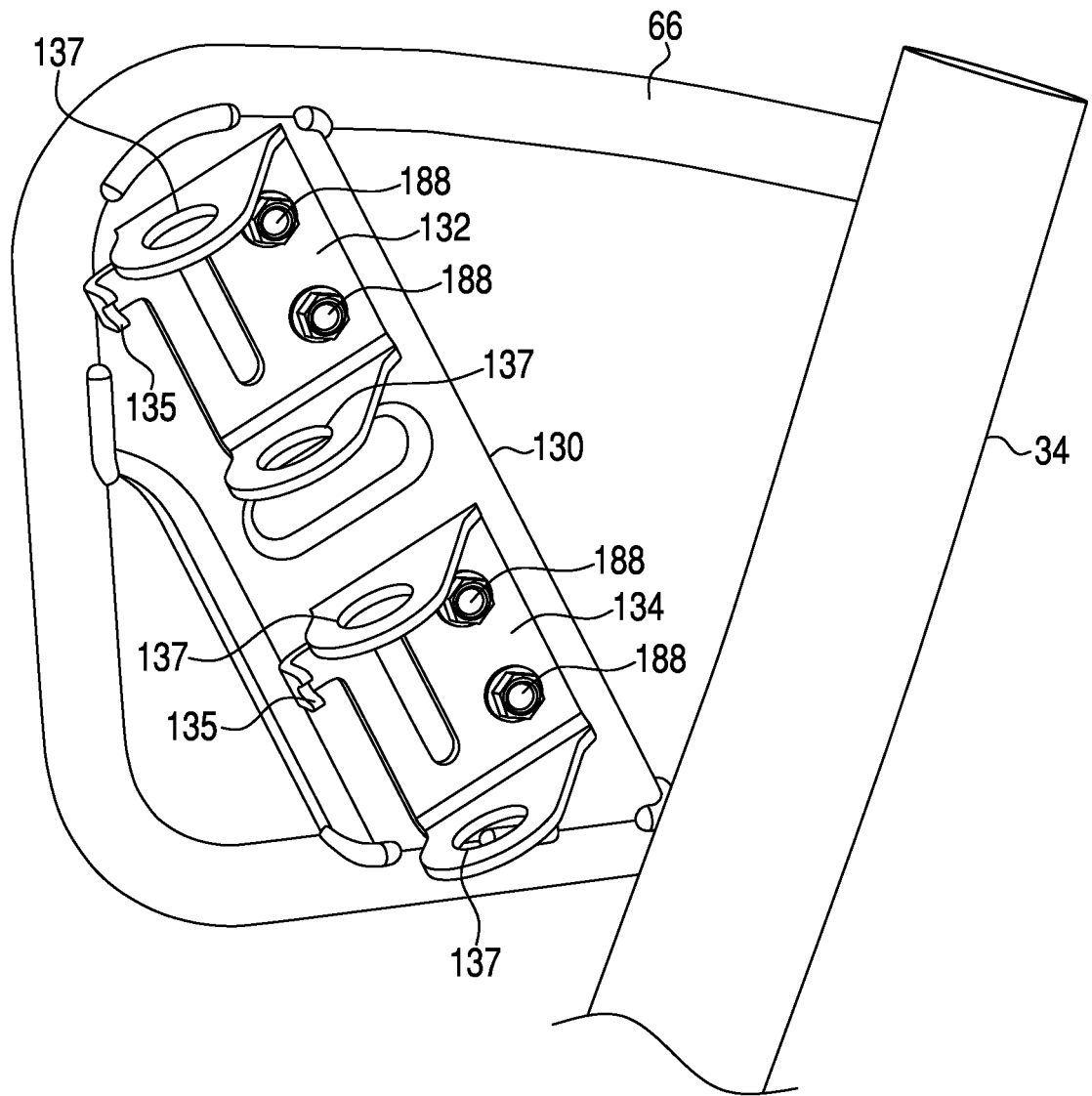
FIG. 11 is a close-up view of another embodiment of hinge brackets mounted to a retention bar.

FIG. 11 depicts another embodiment of a configuration of the hinge brackets 132, 134 that can be integrated into a hinge plate 130 mounted on the retention bar 66. The hinge brackets 132, 134 can be integrated into the hinge plate 130 such that they are aligned along the hinge axis H. The hinge brackets 132, 134 can receive the first hinge 62 and the second hinge 64, respectively. The hinge plate 130 can be mounted to the retention bar 66 with any mechanical fastener, adhesive, weld, or molding. The hinge plate 130 can be formed as an integral part of the retention bar 66 or as a removable separate plate that is attachable to the retention bar 66 on either end.

Figure 12:
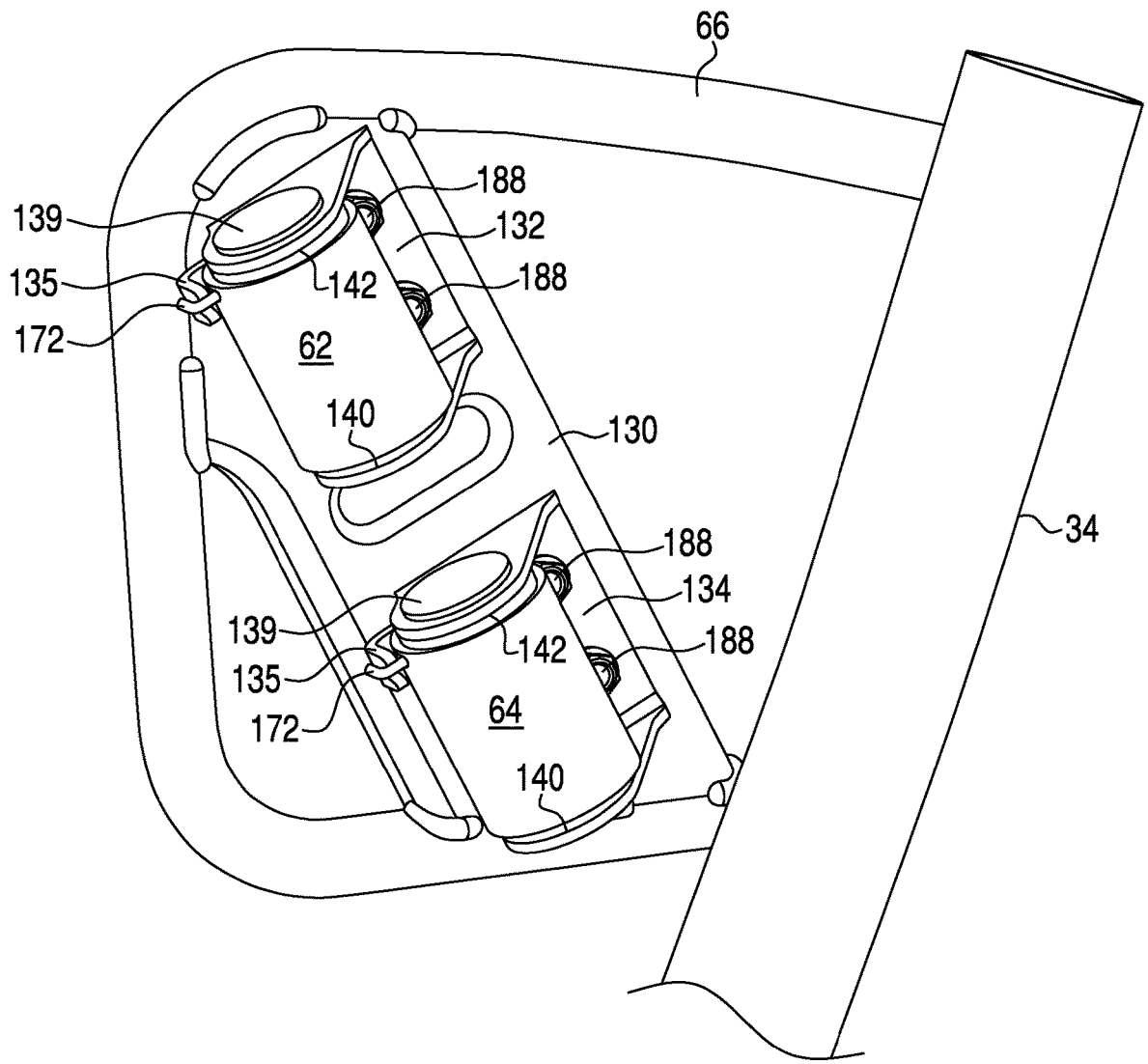
FIG. 12 is a perspective view of door hinges attached to the hinge brackets of FIG. 11 with the remainder of the front door assembly omitted for clarity.

FIG. 12 is a view of the hinge brackets 132, 134 of FIG. 11 with the first hinge 62 and the second hinge 64 of the front door assembly 70 pivotably attached. The remainder of the front door assembly 70 has been omitted for clarity. The first hinge 62 is pivotably attached to the first hinge bracket 132 with a hinge pin 139 and the second hinge 64 is pivotably attached to the second hinge bracket 134 with a hinge pin 139.

Figure 13B:
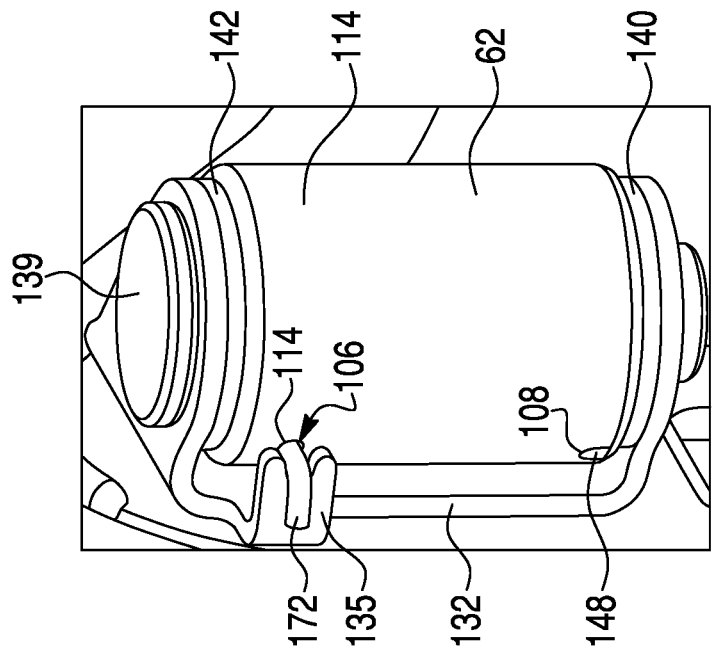
FIG. 13B is a close-up view of one of the door hinges of FIG. 12 in a closed position.
Figure 13A:
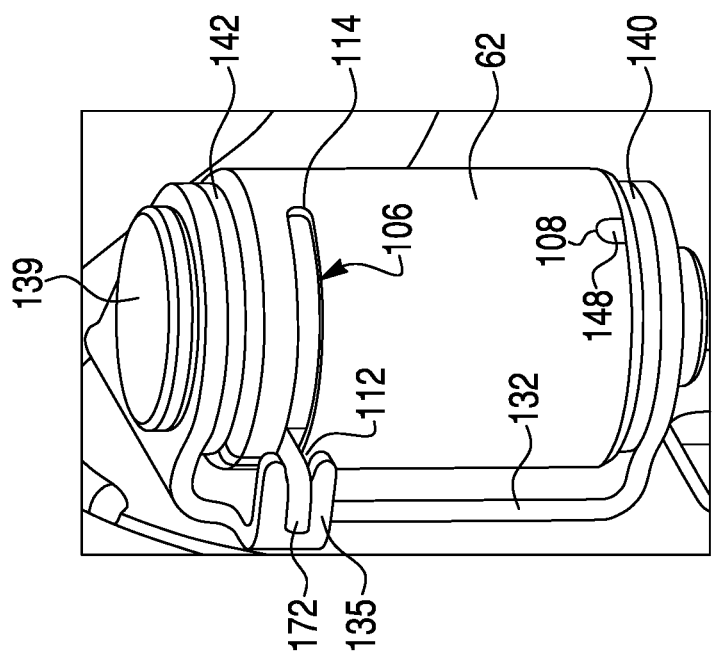
FIG. 13A is a close-up view of one of the door hinges of FIG. 12 in an opened position.

FIGS. 13A and 13B show a close up view of the first hinge 62 attached to the first hinge bracket 132 of FIG. 12 with the remainder of the front door assembly 70 omitted for clarity. FIG. 13A depicts when the front door assembly 70 is in the opened position. FIG. 13B depicts when the front door assembly 70 is in the closed position. Referring to FIG. 13A, the torsion spring 170 within the first hinge 62 abuts a first inner edge 112 of the slot 106 to limit the pivot of first hinge 62 and thus the distance the front door assembly 70 can travel to the completely opened position. Referring to FIG. 13B, the torsion spring 170 abuts a second inner edge 114 of the slot 106 to limit pivoting of the first hinge 62 at the closed position of the front door assembly 70.

Figure 14:
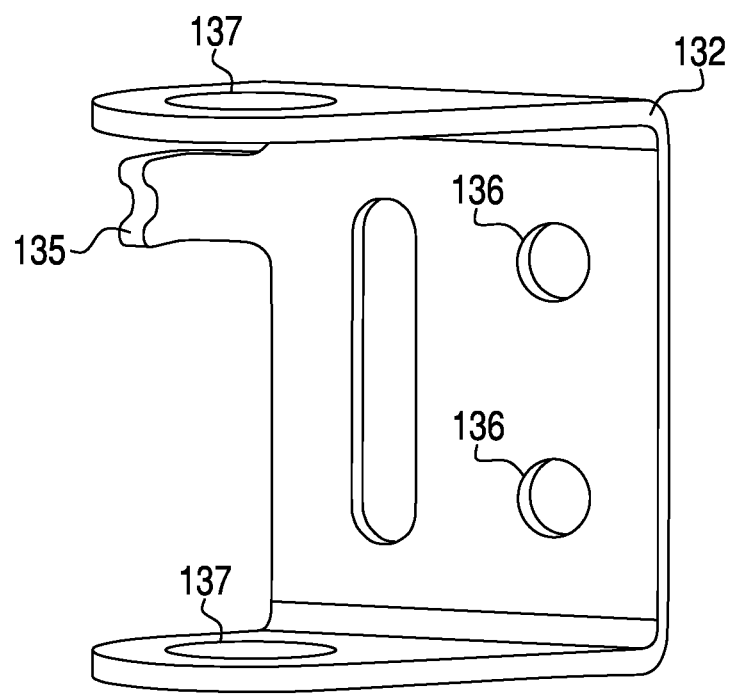
FIG. 14 is a perspective view of a hinge bracket of FIG. 10

FIG. 14 is a close up view of the first hinge bracket 132. The second hinge bracket 134 can have the same structure as the first hinge bracket 132. Each of the first hinge bracket 132 and second hinge bracket 134 can include bracket mount holes 136, hinge pin holes 137, and a spring hook tab 135. The first hinge bracket 132 can be a formed metal sheet piece. The second hinge bracket 134 can have the same shape and components of as the first hinge bracket 132.

Figure 15:
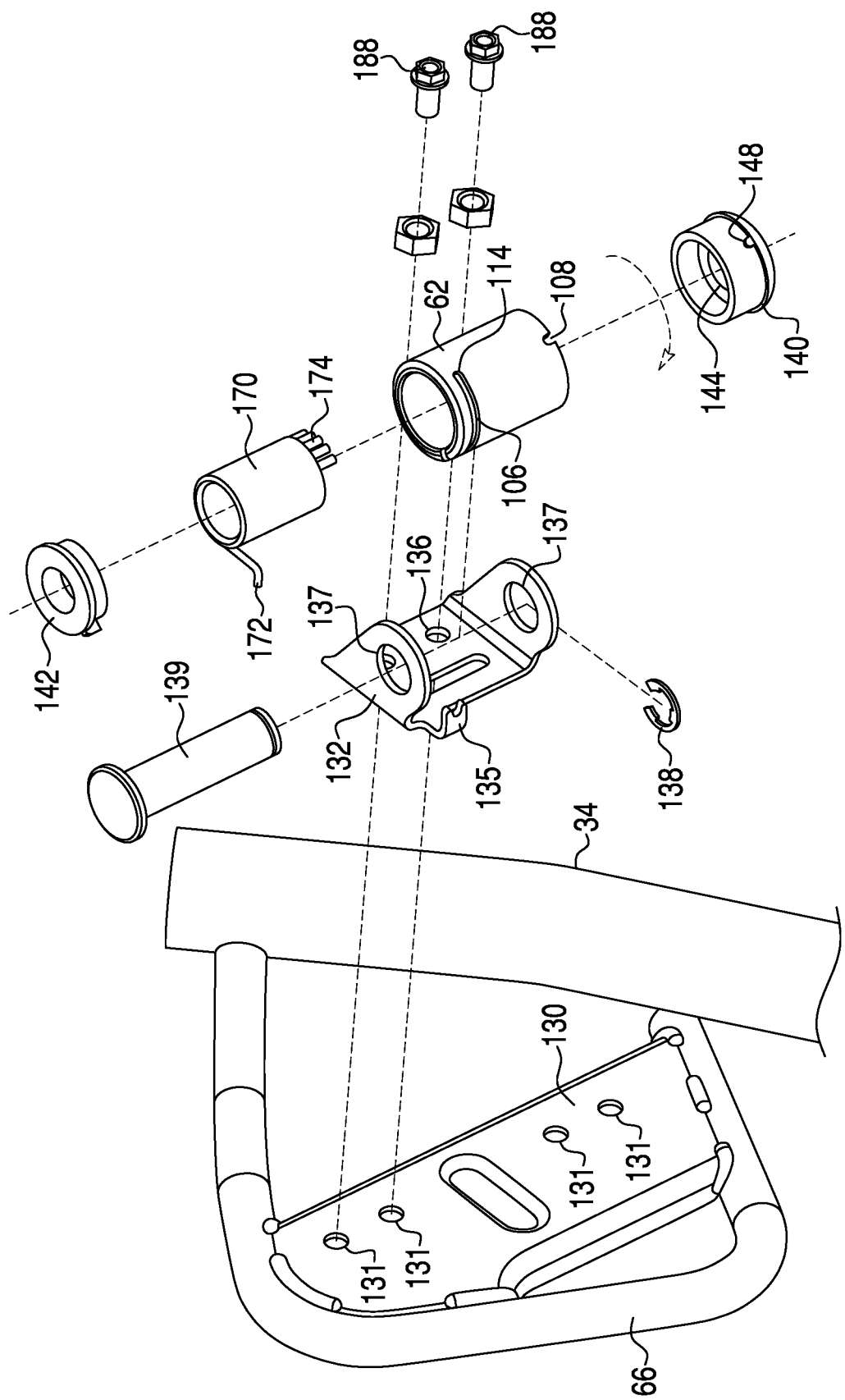
FIG. 15 is an exploded view of the hinges of FIG. 12.

FIG. 15 is an exploded view of the first hinge 62 and first hinge bracket 132 of FIG. 12 with the remainder of the vehicle door assembly 70 removed for clarity. The retention bar 66 can include the hinge plate 130 mounted thereon. The hinge plate 130 can include plate mounting holes 131 that align with the bracket mount holes 136 of the hinge brackets 132, 134. Mounting hardware such as hinge fasteners 188 can pass through the bracket mount holes 136 of the hinge brackets 132, 134 and through the plate mounting holes 131 to secure the hinge bracket 132 to the hinge plate 130. The hinge 62 can include the torsion spring 170 and an upper cap 142 and a lower cap 140. The hinge pin 139 can be inserted through the upper cap 142 and the torsion spring 170, attach to an e-clip 138, and catch in the lower cap 140. The upper cap 142 retains the torsion spring 170 and fills a gap at a start of the groove (i.e., slot 106) in the door. The lower cap 140 can catch the lower arm 174 of the torsion spring 170 and can be rotated to apply a pre-load to the torsion spring 170.

The torsion spring 170 can include an upper arm 172 and a lower arm 174. The torsion spring 170 is depicted as a smooth cylindrical shape in FIG. 15 for clarity. In exemplary embodiments, the torsion spring 170 can be a helical spring that includes metal rod or wire in the shape of a coil, or can be configured as any other type of known torsion spring.

Figure 16:
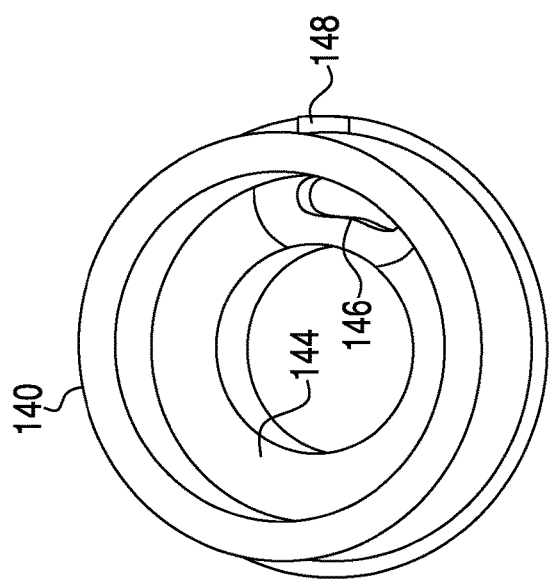
FIG. 16 is a perspective view of a lower cap of FIG. 15.

FIG. 16 is a close up view of the lower cap 140 of FIG. 15. The lower cap 140 can include a pocket 146 and a first mating structure 148. The pocket 146 can be a recessed groove in an inner ring 144 of the lower cap 140. The pocket 146 can be configured to transfer spring load of the torsion spring 170 into the lower cap 140. The pocket 146 can receive and retain the lower arm 174 of the torsion spring 170. The lower cap 140 can rotate causing the pocket 146 to rotate the lower arm 174 of the torsion spring 170.

The first mating structure 148 can have a complimentary shape to a second matting structure 108 on the first hinge 62. The first mating structure 148 and the second mating structure 108 can lock the lower cap 140 to the door assembly 70. The first mating structure 148 can be a protrusion extending from an outer surface of the lower cap 140. The first mating structure 148 can fit into the second mating structure 108 when aligned with the second mating structure 108. The first mating structure 148 can be aligned with the second mating structure 108 when the lower cap 140 is rotated relative to the first hinge 62. Once the first mating structure 148 and the second mating structure 108 are aligned, the lower cap 140 can be pushed toward the first hinge 62 and the first mating structure 148 can slidably insert into the second mating structure 108 to join the lower cap 140 and the first hinge 62 together.

Figure 17:
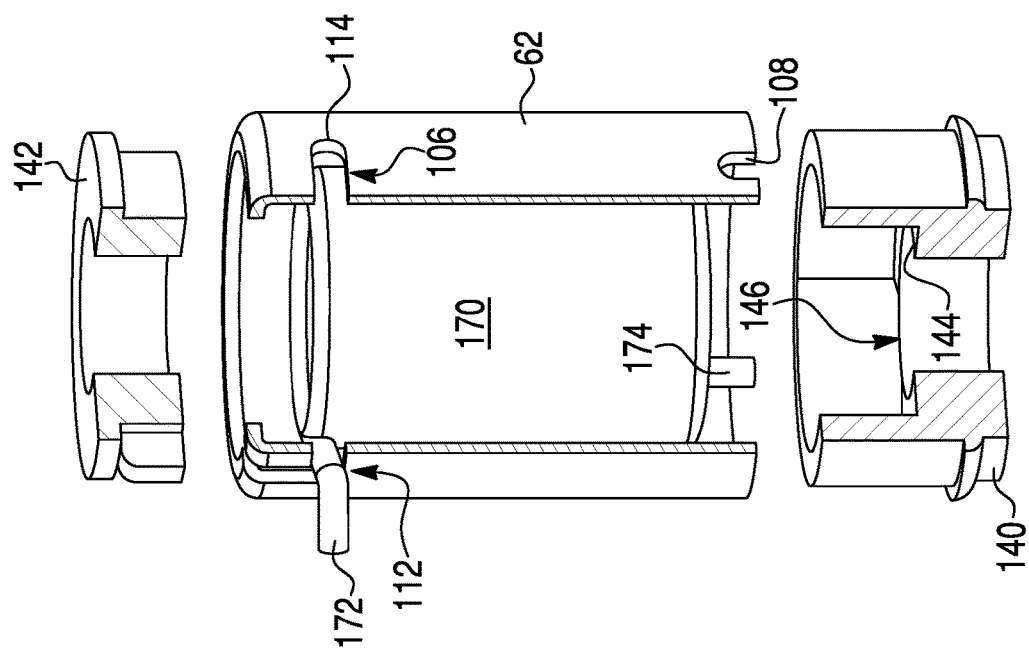
FIG. 17 is a partial sectional view of an assembly of a hinge and spring of FIG. 15.
Figure 19:
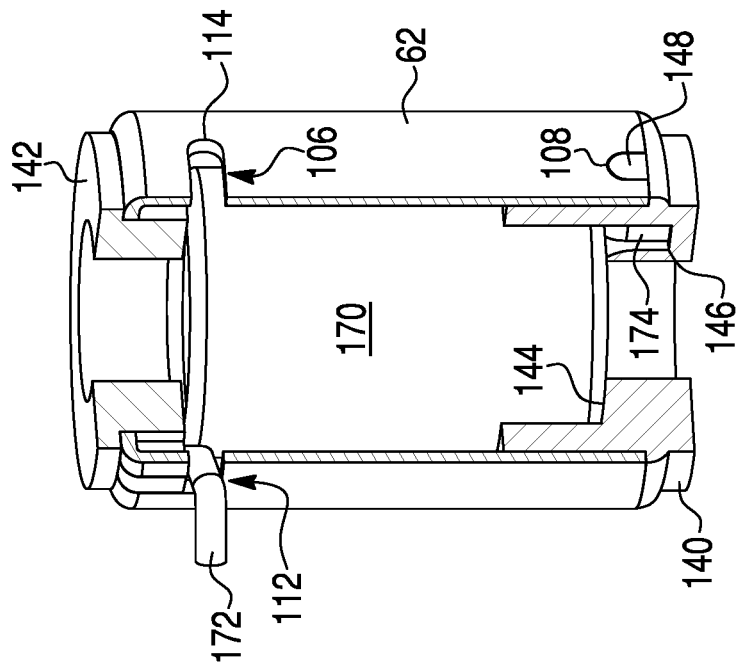
FIG. 19 is a partial sectional view of an assembly of a hinge and spring of FIG. 15.
Figure 18:
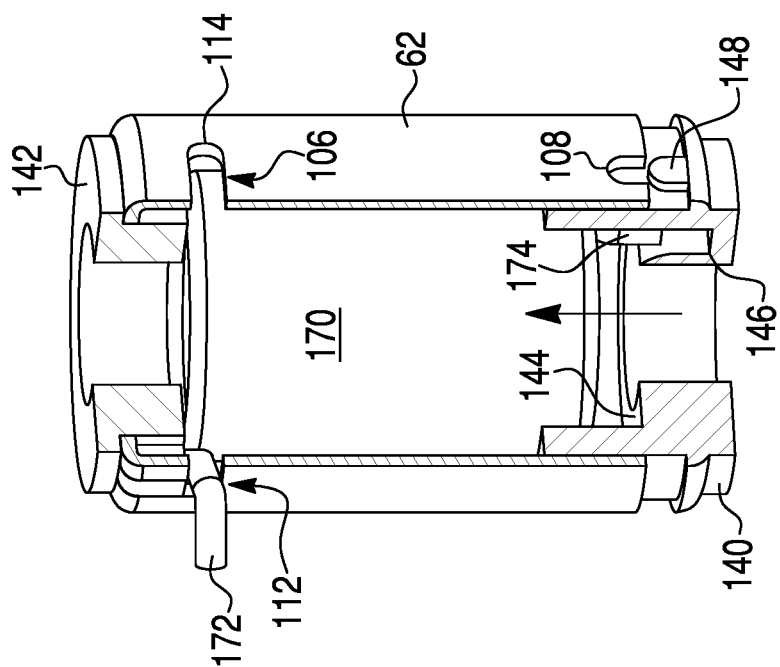
FIG. 18 is a partial sectional view of an assembly of a hinge and spring of FIG. 15.

Referring to FIGS. 17-19 the assembly of the first hinge 62 and torsion spring 170 is shown. To begin assembling the first hinge 62 and the torsion spring 170, the torsion spring 170 is placed inside of the first hinge 62. The upper cap 142 and lower cap 140 are inserted from opposite ends into the first hinge 62 to retain the torsion spring 170 inside the vehicle door 70. The first mating structure 148 of the lower cap 140 is rotated away from the second mating structure 108 of the first hinge 62.

With the lower arm 174 of the torsion spring 170 retained by the pocket 146 in the lower cap 140, the lower cap 140 can be rotated to pre-load the torsion spring 170.

FIG. 18 shows when the lower cap 140 has been rotated so as to align the first mating structure 148 with the second mating structure 108 of the first hinge 62. When the first mating structure 148 and the second mating structure 108 are aligned, the lower cap 140 is ready to be press-fitted and fully inserted into the first hinge 62.

FIG. 19 shows the completed fitting of the lower cap 140 to the first hinge 62. The first mating structure 148 is fit into the second mating structure 108 and the inner ring 144 of the lower cap 140 abuts the torsion spring 170 within the first hinge 62. The torsion spring 170 is loaded so that a spring bias exerts on the vehicle door 70. The spring bias can be directed so as to assist opening of the door 70, for example, against the force of gravity. However, in some applications the spring bias can be set to assist in the closing of the door 70 depending on the configuration of the hinge and the manner in which the door 70 swings.

Figure 21:
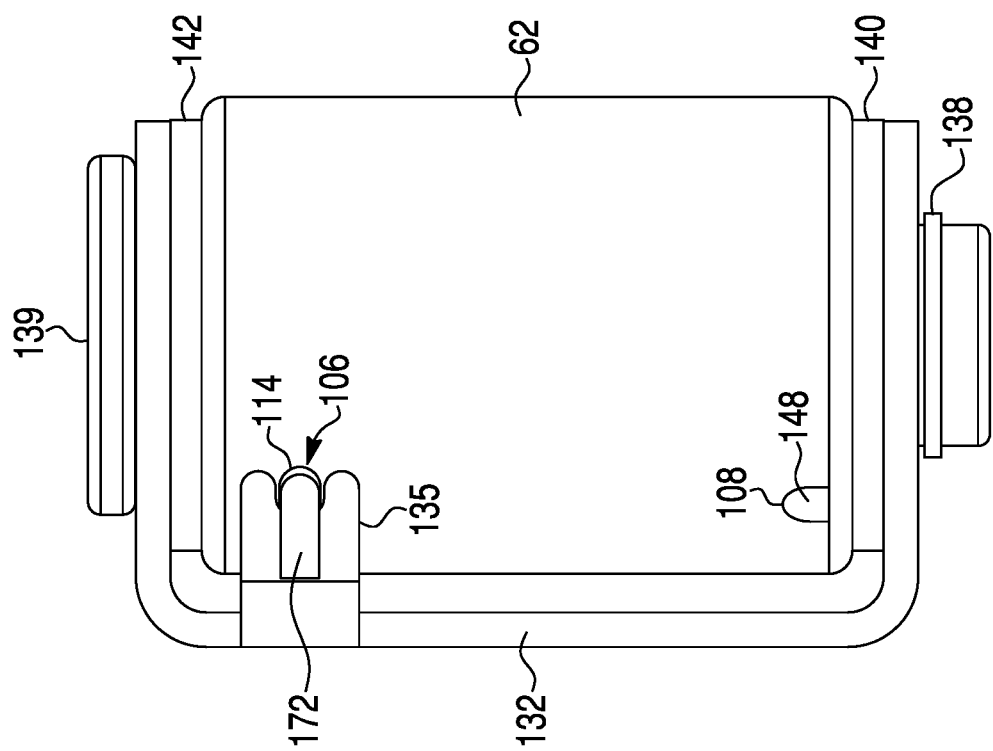
FIG. 21 is a side view of a hinge and a bracket of FIG. 12.
Figure 20:
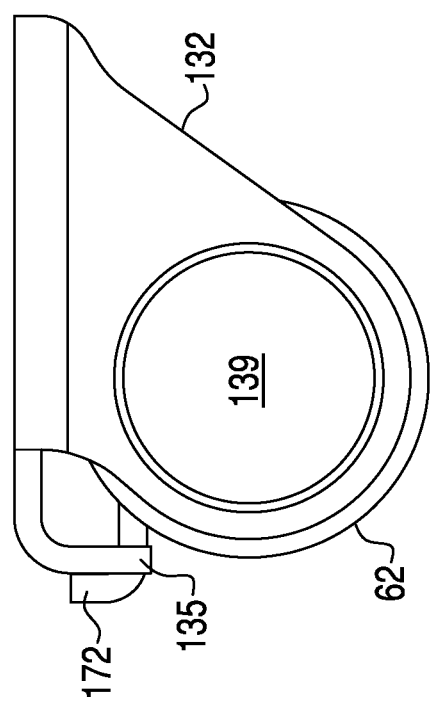
FIG. 20 is a top view of a hinge and a bracket of FIG. 12.
Figure 22:
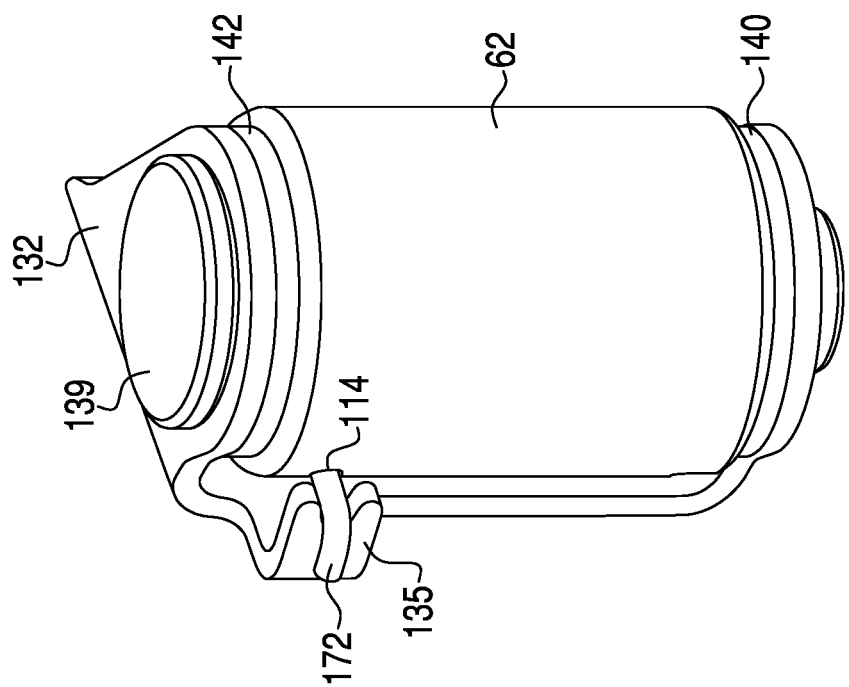
FIG. 22 is a perspective view of a hinge and a bracket of FIG. 12.

Referring to FIGS. 20, 21, and 22, a top, side, and perspective view of the assembled first hinge 62 with the torsion spring 170 inserted therein is shown mounted on the first hinge bracket 132. The upper arm 172 of the torsion spring 170 can be fixed to the spring hook tab 135. The hinge pin 139 can be inserted through the hinge pin holes 137, the upper cap 142 and lower cap 140, and fixed with the e-clip 138.

Figure 23:
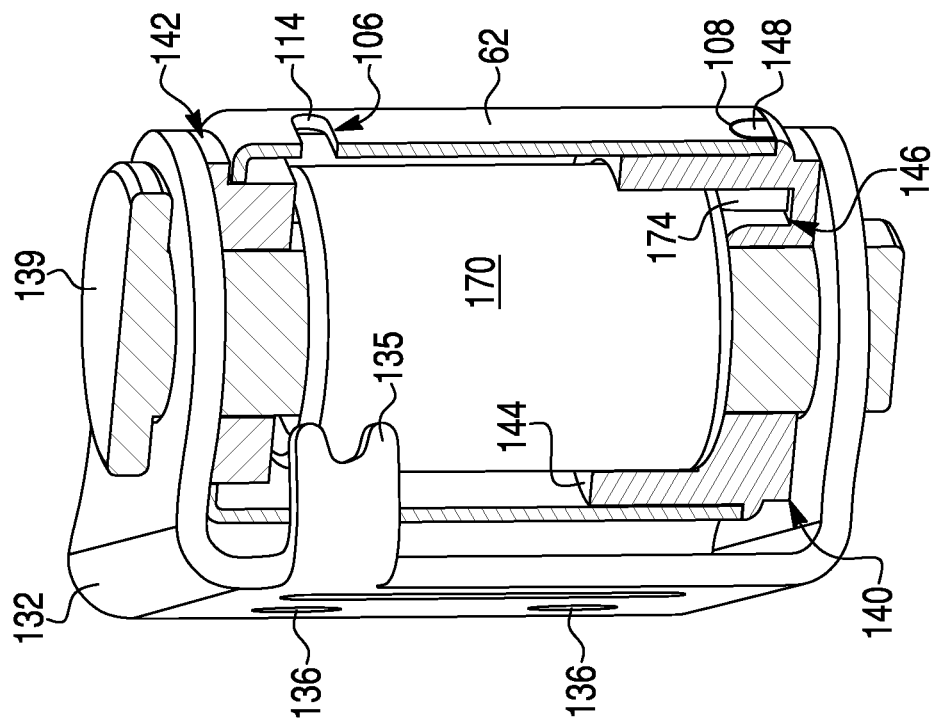
FIG. 23 is a partial sectional view of the hinge and bracket of FIG. 22.

FIG. 23 is a partial sectional view of the first hinge 62 of FIG. 22 showing the torsion spring 170 within the first hinge 62, the hinge pin 139 through the first hinge 62, the upper arm 172 fixed to the spring hook tab 135, and the lower arm 174 of the torsion spring 170 in the pocket 146. The torsion spring 170 is between the upper cap 142 and lower cap 140 and the upper cap 142 and lower cap 140 are disposed between the hinge pin holes 137 and abutting the first hinge bracket 132 in a direction along the hinge axis H.

ALTERNATIVE EMBODIMENTS

While certain embodiments of the presently disclosed subject matter are described above, it should be understood that the presently disclosed subject matter can be embodied and configured in many different ways without departing from the spirit and scope of the presently disclosed subject matter.

As disclosed above, embodiments are intended to be used with any type of vehicle. The frame assembly 18 in conjunction with other support components can be configured to support a powertrain assembly. For example, an exemplary powertrain, as described above, can include a power source such as but not limited to an internal combustion engine (having a single cylinder or a plurality of cylinders), an electric motor, or a hybrid system that includes an internal combustion engine and an electric motor. The powertrain also can include a transmission connected to the power source and a final drive structure. The transmission can include various types of transmissions including a stepped speed ratio assembly or a continuously variable speed ratio assembly. The transmission can be configured as an automatic transmission, a manual transmission, or a semi-automatic transmission. A power source and the transmission can be connected to the frame assembly 18 in any appropriate manner such as but not limited to brackets and mechanical fasteners, welds, rivets, rubber mounting assembly(ies), fluid filled mounting assembly(ies), or any combination thereof.

It is appreciated that the various components of embodiments of the disclosure can be made from any of a variety of materials including, for example, metal, plastic, plastic resin, nylon, composite material, leather, and/or rubber, for example, or any other material as may be desired.

In exemplary embodiments, instead of a top net assembly 24, there can be a roof panel disposed above the passenger space 86. The roof panel can be made of plastic or any material known in the art for roof panels and can cover the space between the upper frame members 38, 39 and the transverse frame members 41, 42, 43.

In exemplary embodiments, the net assembly 90 can include any type of net attachments 94 and fasteners 96. The net assembly 90 can include any number of net attachments 94 and fasteners 96 located anywhere on the frame assembly, door panel, or other location of the vehicle. Net attachments and fasteners can each include, but are not limited to, buckles, straps, grommets, apertures, hook and loop, or any other structure that allows the net assembly 90 to be attached to a door assembly of the vehicle 10.

In exemplary embodiments, each opening of the vehicle 10 can include a net assembly. Net assemblies can be any shape and include any orientation of net attachments and fasteners to cover the respective opening. The net 92 can be nylon, cotton, plastic, any elastic material, or any other material as desired. The net assemblies can also be a combination of materials and structures. For example, the net assemblies can be a series of stringers attached to a central window portion, where the stringers are each attached to the vehicle frame and/or door assembly via attachments/fasteners 94/96.

In exemplary embodiments, the vehicle 10 can have configurations of a frame assembly 18 having two door assemblies, four door assemblies, six door assemblies or any number of door assembly. The frame assembly 18 can have an extended storage space in the rear of the vehicle. The storage area can extend in the rear longitudinal direction L of the vehicle behind the rear-most row of seats.

In exemplary embodiments, the rear door assemblies 76, 78 can be attached to a rear panel 48, a third side frame member, or any other structure of the vehicle 10. Rear door assemblies 76, 78 can have the same hinge axis as the front door assemblies 70, 72. Alternatively, rear door assemblies 76, 78 can have a different hinge axis as long as the angle of the hinge axis is an acute angle measured in the frontward direction between the vertical direction V of the vehicle 10 and hinge axis H.

In exemplary embodiments, the door assemblies can each have fully opened and fully closed positions. Additionally, an opened (or open) position can include any position of the door assembly between the fully closed position and up to and including the fully opened position. A closed position can refer to the fully closed position. Instead of referring to the door assembly as having opened and closed positions, the door panel can also be referred to as having an opened and closed position that corresponds to the opened and closed position of the door assembly. The opened and closed position can designate the same position whether referring to the door panel or the door assembly.

In exemplary embodiments, the strut 58 can be any type of strut known in the art including, but not limited to, gas dampers, compression gas springs, safety shroud gas springs, adjustable locking gas springs, stainless steel gas springs, dampers, tension gas springs, gas struts, or mechanical struts.

Frame members of the frame assembly 18 can be connected together to form a fixed frame assembly or modular frame assembly in which selective removal and attachment is not or is not intended. That is, the frame members can be intended to remain fixed to each other unless a destructive process such as but not limited to sawing, cutting, crushing, ripping, melting, etc., is applied to the fixed frame assembly.

In contrast, some frame members can be intended to be selectively removable and attachable to a remainder of the frame assembly 18, for example, without requiring a destructive process such as but not limited to sawing, cutting, crushing, ripping, melting, etc.

The frame assembly 18 can be made from any appropriate structural element(s), such as but not limited to tubes, beams, stampings, etc., that can provide sufficient strength and rigidity for a vehicle passenger space 86. The frame assembly 18 can be formed from a single type of structural element, or alternatively the frame members can be formed from any combination of these structural elements. The structural elements can have any appropriate cross-sectional shape, such as but not limited to circular, rectangular, regular polygonal, irregular polygonal, hollow, solid, variable along the length of the structural element, I-beam, etc.

The structural elements can be formed by any appropriate process, such as but not limited to rolling, hydroforming, bending, welding, extruding, stamping, any combination of these processes, etc. Each structural element of the frame assembly 18 can be formed from any appropriate material, such as but not limited to steel, aluminum, titanium, magnesium, plastic, fiber-reinforced plastic, carbon fiber, ceramic, a composite formed from any combination of these exemplary materials, etc. Each structural element of the frame assembly 18 can be connected to each adjoining structural element in any appropriate manner, such as but not limited to mechanical fasteners, welding, adhesive, any combination thereof, etc.

Each of the door assemblies 70, 72, 76, 78 can be constructed as desired. For example, the door assemblies can be constructed of one or more panels of a respective door panel assembly. Each of the panel assemblies 50 can have an uninterrupted exterior surface. Alternatively, the door panel assemblies can be constructed in various other manners as may be desired. For example, each of the door panel assemblies can include an inner panel 152 that faces toward the passenger space 86 of the vehicle 10 and an outer panel 153 that faces toward the exterior of the vehicle 10. The inner door panel 152 can be connected to the outer door panel 153 such that a space is enclosed therebetween. One or more of the door panel assemblies 50 can have a continuous outer surface or an outer surface that is interrupted by one or more holes, ridges and/or other contour or character features.

Door panels 50 can have any desired shape and size. Door panels 50 can be aluminum, plastic, carbon fiber, multi-material, or any other material or combination of materials known to one of ordinary skill in the art.

Brackets 160 and 162 are described as pivotable brackets. Any type of pivotable bracket known in the art may be used. One of ordinary skill would recognize a number of brackets and or configurations with a strut that can be used to ensure the first end of a strut stays fixed to a frame member beneath a seat while another end of the strut moves outward and upward away from the first end while remaining attached to the inner door panel. For example, each bracket 160 and 162 can have coaxial holes that attach to the strut 58 with a pin.

In exemplary embodiments the net 92 can be in tension when the door assembly is in the closed position. In tension can mean the net has some degree of flexibility and is not fully rigid, but generally retains its shape and is not flaccid or bent over or folded over with respect to itself.

The first hinge 62 and the second hinge 64 can have the same shape and structure. That is, the second hinge 64 can include the slot 106 and the second mating structure 108. The second hinge 64 can fit together with the hinge pin 139, the upper cap 142, the torsion spring 170, the lower cap 140, the hinge fasteners 188, the second hinge bracket 134, the e-clip 138, and the retention bar 66 in the same manner as the first hinge 63 can, as described in the embodiments above.

What is claimed is:

1. A door assembly for a vehicle for selectively opening and closing an opening in a frame assembly of the vehicle, the door assembly comprising:
   a door panel having a front edge and a rear edge, the front edge located closer to a front of the vehicle than the rear edge, and the door panel pivotably attached to the frame assembly along a hinge axis such that the door panel is pivotable about the hinge axis, the hinge axis being angled away from a vertical direction of the vehicle at an acute angle;
   a hinge disposed at the rear edge of the door panel and rotatable about the hinge axis, the door panel configured to pivot about the hinge axis between an opened position and a closed position; and
   a strut connected to the door panel and movable between an extended position and a retracted position, the strut being in the extended position when the door panel is in the opened position and in the retracted position when the door panel is in the closed position, and the strut configured to be pivotably attached to the vehicle when the door assembly is mounted on the frame assembly of the vehicle.

2. The door assembly of claim 1, further comprising:
   a net;
   a plurality of net attachments disposed along a perimeter of the net;
   a first fastener disposed at the front edge of the door panel, wherein
      the first fastener is connected to at least one of the plurality of net attachments.

3. The door assembly of claim 2, wherein the hinge, door panel, and net are configured such that a distance between
   a first net attachment located at a lowermost and frontmost location on the net, and
   a second net attachment located at an uppermost and frontmost location on the net,
   is greater when the door panel is in the closed position as compared to when the door panel is in the opened position.

4. The door assembly of claim 1, wherein
   the hinge axis and the vertical direction of the vehicle form an acute angle such that the hinge axis extends from a lower portion of the vehicle upwardly towards the front of the vehicle when the door assembly is mounted on the frame assembly.

5. The door assembly of claim 1, further comprising:
   a net connected to the door panel, wherein the door panel and hinge are configured such that when the door panel is in the closed position the net is placed into a substantially planar tensioned configuration, and when the door panel is in the opened position the net is placed into a non-planar slack configuration.

6. The door assembly of claim 1, further comprising:
   a net connected to the door panel, the net including a front leading edge extending from a lowermost frontmost corner of the net to an uppermost frontmost corner of the net, wherein the front leading edge is substantially linear when the door panel is in the closed position and the front leading edge is placed in an arcuate and less linear configuration when the door panel is in the opened position.

7. An all-terrain vehicle, comprising:
   a rollover protection assembly including,
      first and second longitudinal frame members extending in a longitudinal direction of the vehicle and spaced apart in a transverse direction of the vehicle,
      a first side frame member extending from the first longitudinal frame member in a vertical direction of the vehicle,
      a second side frame member extending from the first longitudinal frame member in the vertical direction of the vehicle,
      an upper frame member extending in a longitudinal direction of the vehicle and connected to the first side frame member, and the second side frame member,
   a first opening bounded by the first longitudinal frame member, the first side frame member, and the second side frame member;
   a front door assembly that extends across the first opening and between the first and second side frame members, the front door assembly being movably connected to the rollover protection assembly between an opened position and a closed position to selectively open and close the first opening, the front door assembly including,
      a net assembly,
      a door panel having a front edge and a rear edge, the door panel pivotably attached to the rollover protection assembly along a hinge axis, the hinge axis being angled away from a longitudinal axis of the first longitudinal frame member at an acute angle,
      a hinge disposed at the rear edge,
         the door panel configured to pivot about the hinge axis between the opened position and the closed position, and
      a strut connected to the door panel and movable between an extended position when the front door assembly is in the opened position and a retracted position when the front door assembly is in the closed position.

8. The all-terrain vehicle of claim 7, wherein the net assembly includes
   a net;
   a plurality of net attachments disposed along a perimeter of the net;
   a first fastener disposed at a location where a top edge of the door panel meets the front edge of the door panel, wherein
      at least one of the plurality of net attachments is connected to the first fastener.

9. The all-terrain vehicle of claim 8, wherein the net assembly further includes:
   a second fastener located at the rollover protection assembly for connecting to one of the net attachments, wherein
   a linear distance between the first fastener and the second fastener when the front door assembly is in the closed position is greater than a linear distance between the first fastener and the second fastener when the front door assembly is in the opened position.

10. The all-terrain vehicle of claim 7, further comprising:
    a net connected to the door panel, the net including a front leading edge extending from a lowermost frontmost corner of the net to an uppermost frontmost corner of the net, wherein the front leading edge is substantially linear when the front door assembly is in the closed position and the front leading edge is placed in an arcuate and less linear configuration when the front door assembly is in the opened position.

11. The all-terrain vehicle of claim 7, wherein the front door assembly is configured to swing through an arc that is greater than 90 degrees when the front door assembly pivots from a fully closed position to a fully opened position.

12. The door assembly of claim 7, further comprising:
a net connected to the door panel, wherein the door panel, net, and hinge are configured such that when the door panel is in the closed position the net is in a substantially planar tensioned configuration and when the door panel is in the opened position the net is in a slack non-planar configuration in less tension than the tensioned configuration.

13. The all-terrain vehicle of claim 7, wherein the hinge axis and the vertical direction of the vehicle form an acute angle such that the hinge axis extends from a lower portion of the vehicle upward toward a front of the vehicle.

14. The all-terrain vehicle of claim 7, further comprising:
a second opening bounded by the first longitudinal frame member, the second side frame member, and a third side frame member;
a rear door assembly that extends across the second opening and between the second and third side frame members, the rear door assembly being movably connected to the rollover protection assembly between an opened position and a closed position to selectively open and close the second opening, the rear door assembly including:
a rear net assembly,
    a rear door panel having a front edge and a rear edge, the rear door panel pivotably attached to the rollover protection assembly along a rear hinge axis,
    the rear hinge axis being angled away from a vertical direction of the vehicle at an acute angle,
    a rear hinge disposed at the rear edge of the rear door panel,
        the rear door panel configured to pivot about the rear hinge axis between the opened position and the closed position, and
    a rear gas strut connected to the rear door panel and pivotably attached to the rollover protection assembly,
        the rear gas strut being movable between an extended position when the rear door assembly is in the opened position and a retracted position when the rear door assembly is in the closed position.

15. The all-terrain vehicle of claim 7, further comprising:
a seat frame member, wherein
the strut is pivotably attached to the seat frame member, and
    the strut is substantially parallel to the seat frame member when the front door assembly is in the closed position and the gas strut is extended away from the seat frame member when the front door assembly is in the opened position.

16. A vehicle, comprising:
a frame assembly including a plurality of frame members connected together to extend around a passenger space;
a first opening bounded by the plurality of frame members;
a plurality of wheels attached to the frame assembly; and
a door assembly that extends across the first opening in a closed position and extends away from the opening in an opened position, the door assembly including:
    a door panel having a front edge and a rear edge, the front edge located closer to a front of the vehicle than the rear edge, the door panel pivotably attached to the frame assembly via a hinge along a hinge axis,
        the hinge axis being angled away from a vertical direction of the vehicle at an acute angle, the hinge disposed at the rear edge of the door panel,
        the door panel being pivotable about the hinge axis between the opened position and the closed position, and
    a net connected to the door panel and frame assembly,
        the net being movable between a curved configuration when the door assembly is in the opened position and a relatively less curved configuration when the door assembly is in the closed position.

17. The vehicle of claim 16, wherein the plurality of frame members includes,
    a first longitudinal member extending in a longitudinal direction of the vehicle,
    a second longitudinal member extending in a longitudinal direction of the vehicle and spaced apart from the first longitudinal member in a transverse direction of the vehicle,
    an A pillar extending from the first longitudinal member in a vertical direction of the vehicle,
    a B pillar extending from the first longitudinal member in a vertical direction of the vehicle,
    a C pillar extending from the first longitudinal member in a vertical direction of the vehicle,
    the B pillar being located between the A pillar and the C pillar in the longitudinal direction of the vehicle,
    a first upper frame member extending in a longitudinal direction of the vehicle, spaced apart from the first longitudinal member in a vertical direction of the vehicle, and connected to each of the A pillar, B pillar, and C pillar, and
    a second upper frame member extending in a longitudinal direction of the vehicle, spaced apart from the second longitudinal member in a vertical direction of the vehicle.

18. The vehicle of claim 16, wherein the net includes a plurality of attachment points for connecting to at least one of the door panel and frame assembly, wherein
the hinge, door panel, and net are configured such that a distance between
    a first net attachment located at a lowermost and frontmost location on the net relative to the vehicle, and
    a second net attachment located at an uppermost and frontmost location on the net relative to the vehicle,
is greater when the door assembly is in the closed position as compared to when the door assembly is in the opened position.

19. The vehicle of claim 16, wherein the hinge axis forms an acute angle less than 80 degrees with respect to a longitudinal axis of the first longitudinal member such that the hinge axis extends upward from a rear of the vehicle towards a front of the vehicle.

20. The vehicle of claim 16, wherein the door panel, net, and hinge are configured such that when the door panel is in the closed position the net is placed into a substantially planar tensioned configuration, and when the door panel is in the opened position the net is placed into a non-planar slack configuration.

\* \* \* \* \*